(12) United States Patent
Ratert et al.

(10) Patent No.: US 6,505,117 B1
(45) Date of Patent: Jan. 7, 2003

(54) METHOD FOR NAVIGATING AN OBJECT

(75) Inventors: Matthias Ratert, Nordwalde (DE); Reza Serafat, Bochum (DE)

(73) Assignee: Nokia Mobile Phones, Espoo (FI)

( * ) Notice: Subject to any disclaimer, the term of this patent is extended or adjusted under 35 U.S.C. 154(b) by 0 days.

(21) Appl. No.: 09/505,278

(22) Filed: Feb. 16, 2000

(30) Foreign Application Priority Data

Feb. 18, 1999 (DE) .......................................... 199 06 863

(51) Int. Cl.[7] .............................................. G01C 21/00
(52) U.S. Cl. ...................................... 701/209; 701/208
(58) Field of Search ................................ 701/208, 209, 701/211, 213, 24, 25, 117; 340/988, 990, 995, 905; 73/178 R

(56) References Cited

U.S. PATENT DOCUMENTS 5,486,822 A * 1/1996 Tenmoku et al. ............ 340/995
5,610,821 A * 3/1997 Gazis et al. ................. 455/456

FOREIGN PATENT DOCUMENTS

| DE | 39 05 493 | 8/1990 |
|----|-----------|--------|
| DE | 196 11 915 | 10/1997 |
| DE | 297 05 537 | 12/1997 |
| DE | 197 53 170 | 6/1998 |
| DE | 196 51 1476 A | 6/1998 |
| DE | 198 10 173 | 10/1999 |
| WO | 93/03452 | 2/1993 |

OTHER PUBLICATIONS

"Verkehrstelematik mit Mobilfunk", in Funkschau 20/97, pp. 66–73, no date.

EVA–Netzabbildung und Routensuche fur ein fahrzeugautonomes Ortungs–und Navigationssystem; Alois Fuchs et al., Apr. 1983; pp. 220–223.

* cited by examiner

Primary Examiner—Yonel Beaulieu
(74) Attorney, Agent, or Firm—Perman & Green, LLP

(57) ABSTRACT

A method for navigating an object, such as a radio telephone, from a starting point to a destination along traffic routes that are contained in an electronically stored traffic route map and are in the form of routing points. The routing points are assigned routing values which, starting from the destination, either only increase or only decrease as the distance from the destination grows larger. The object is then navigated by following a path of routing values which only decrease or only increase.

19 Claims, 33 Drawing Sheets

EICKELER WAY

IN 800 m

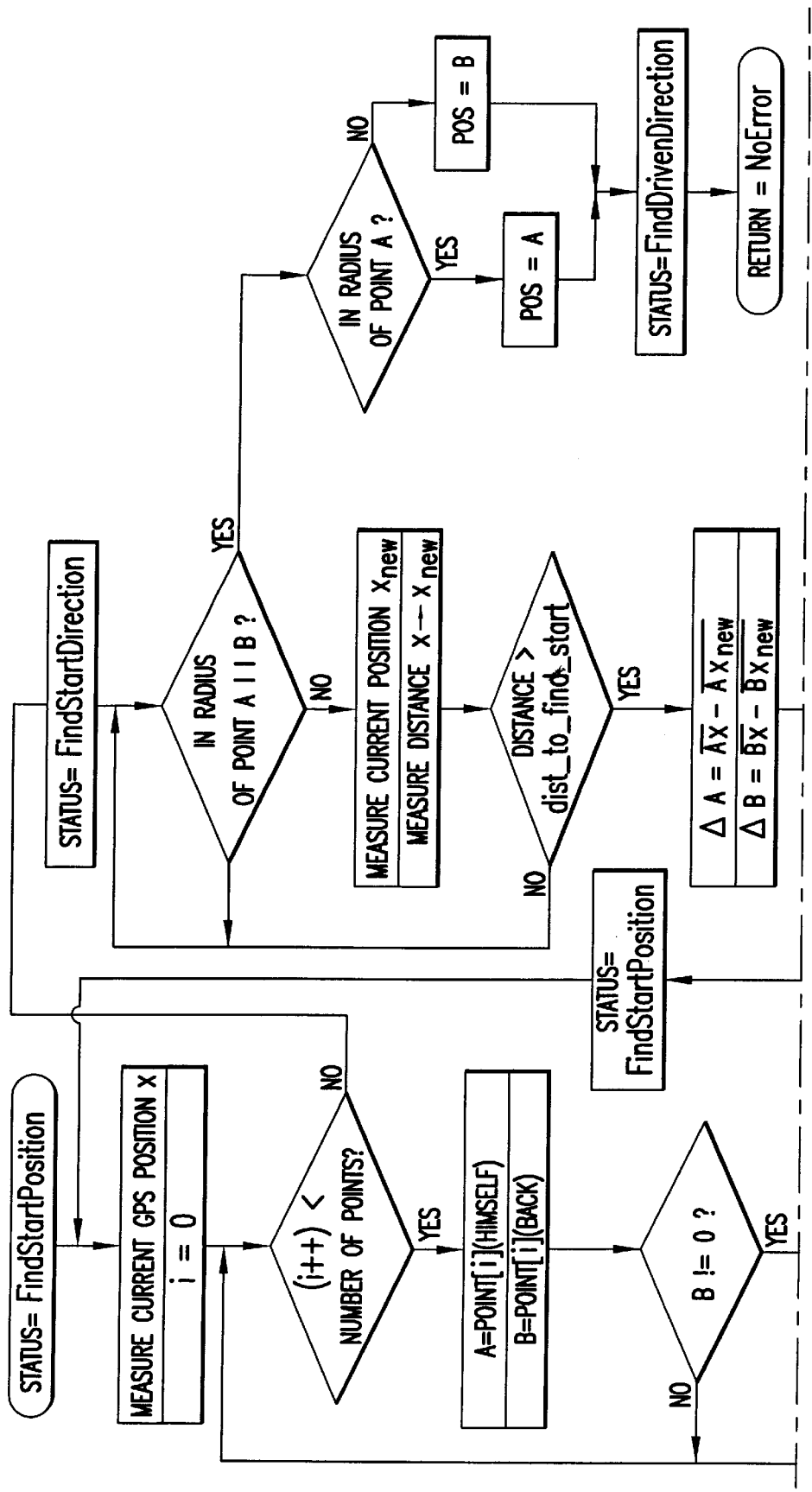

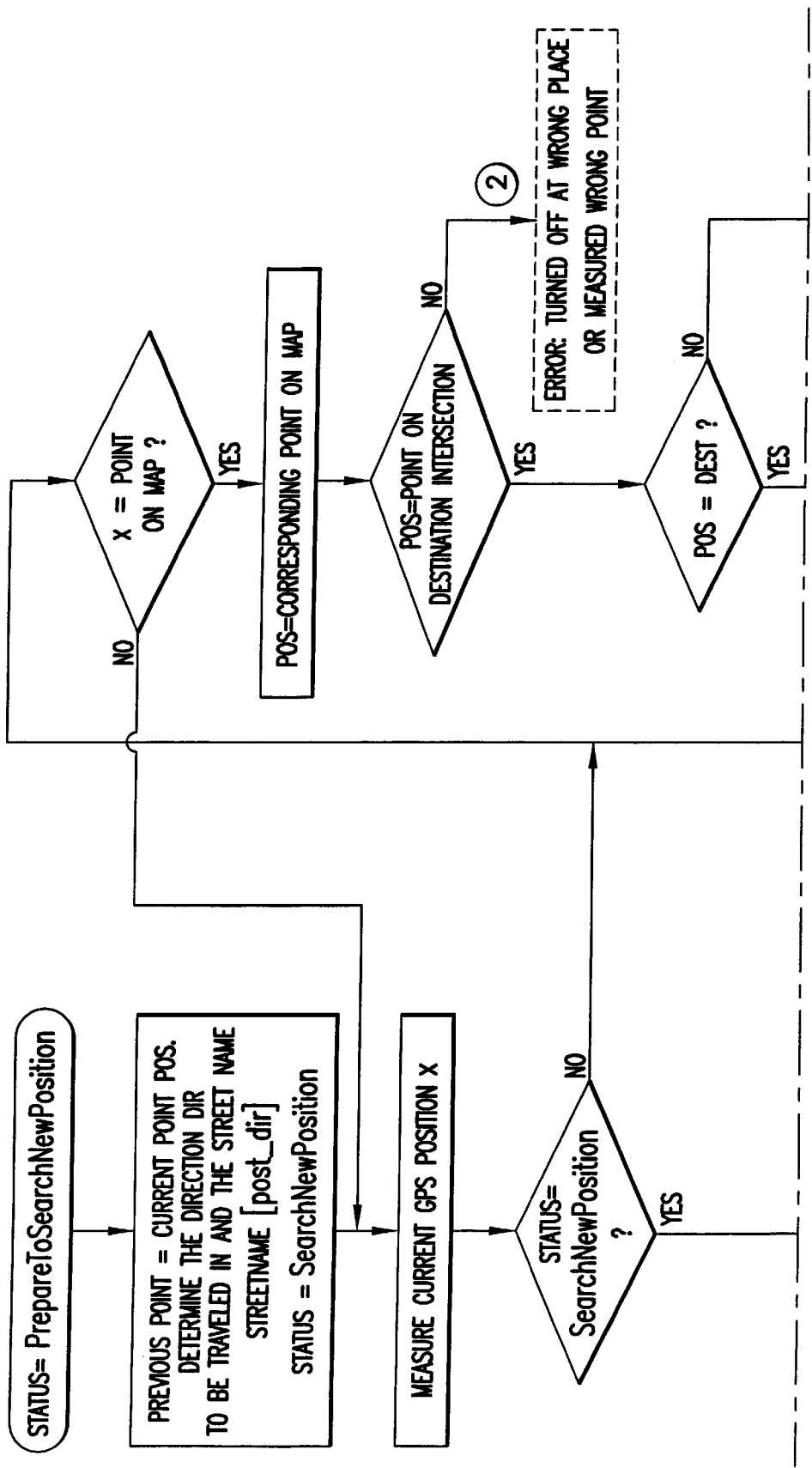

| DIFFERENCE BETWEEN ANGLES | DIRECTION AT ε=50° |
|---|---|
| 0° - 40° | STRAIGHT AHEAD |
| 40° - 140° | TO RIGHT |
| 140° - 220° | TURNED AROUND |
| 220° - 320° | TO LEFT |
| 320° - 360° | STRAIGHT AHEAD |

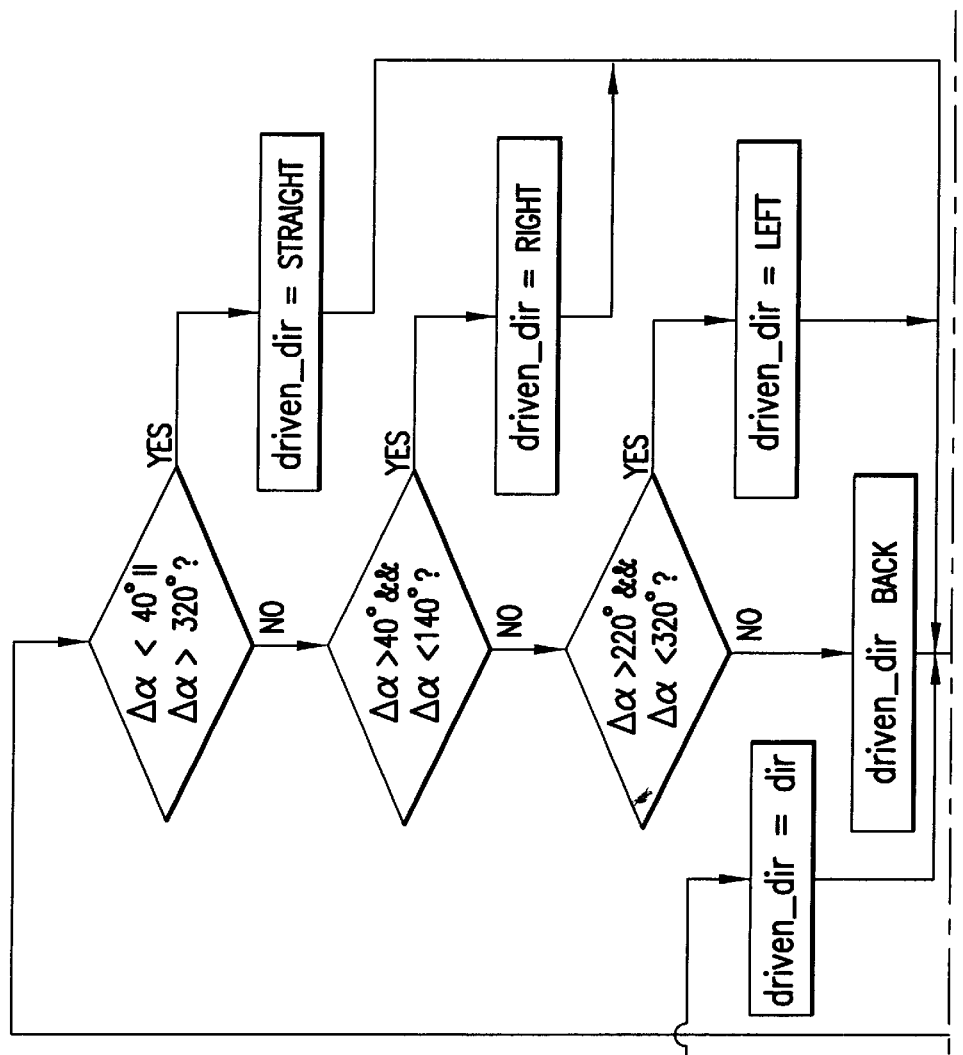
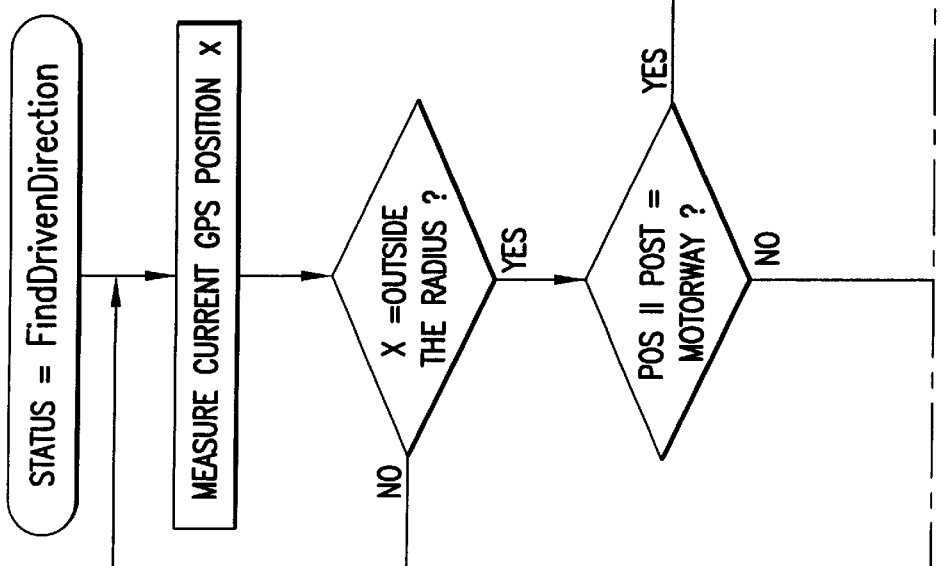
FIG.23A
FIG.23
| FIG.23A |
|---------|
| FIG.23B |

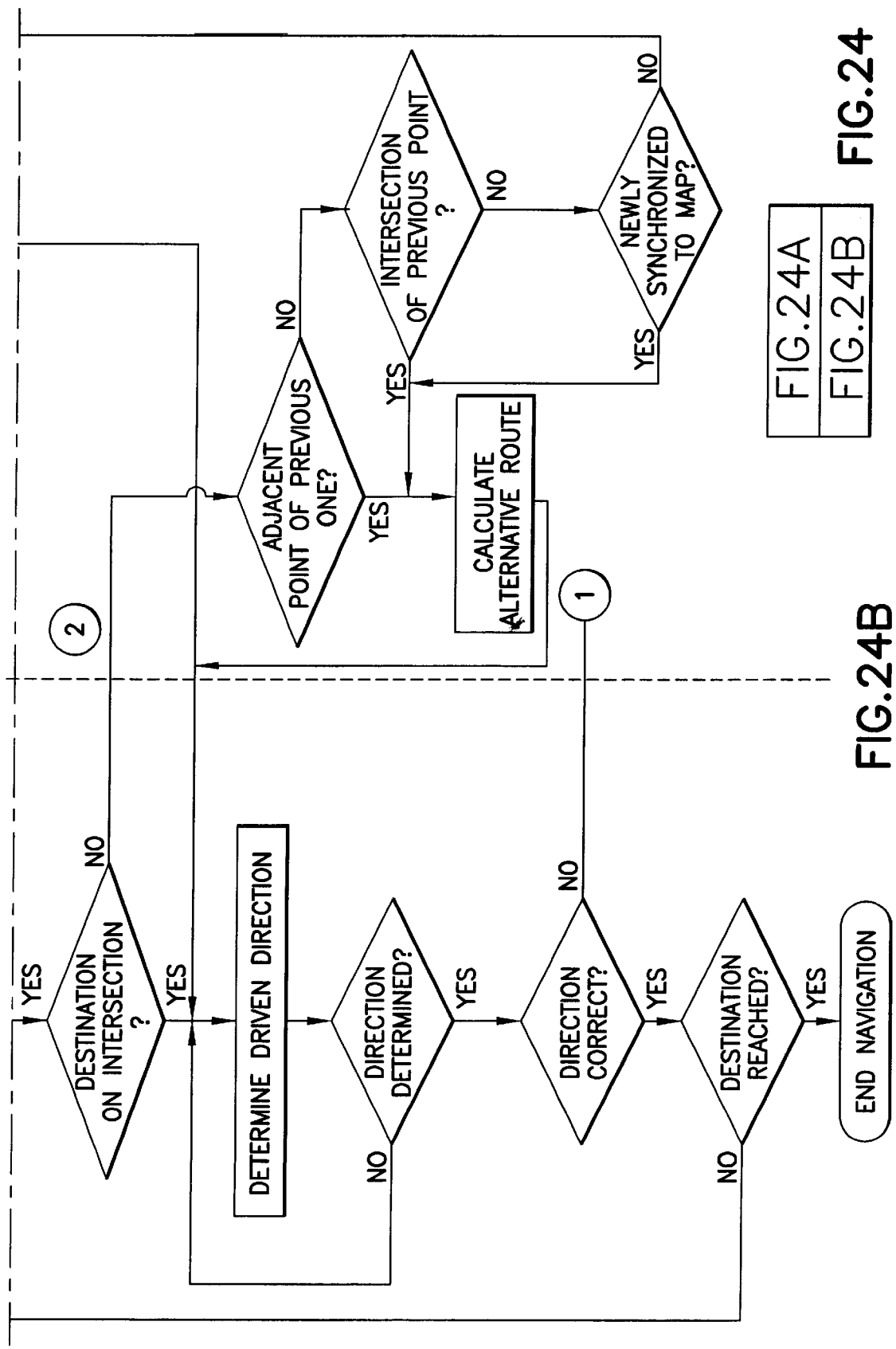

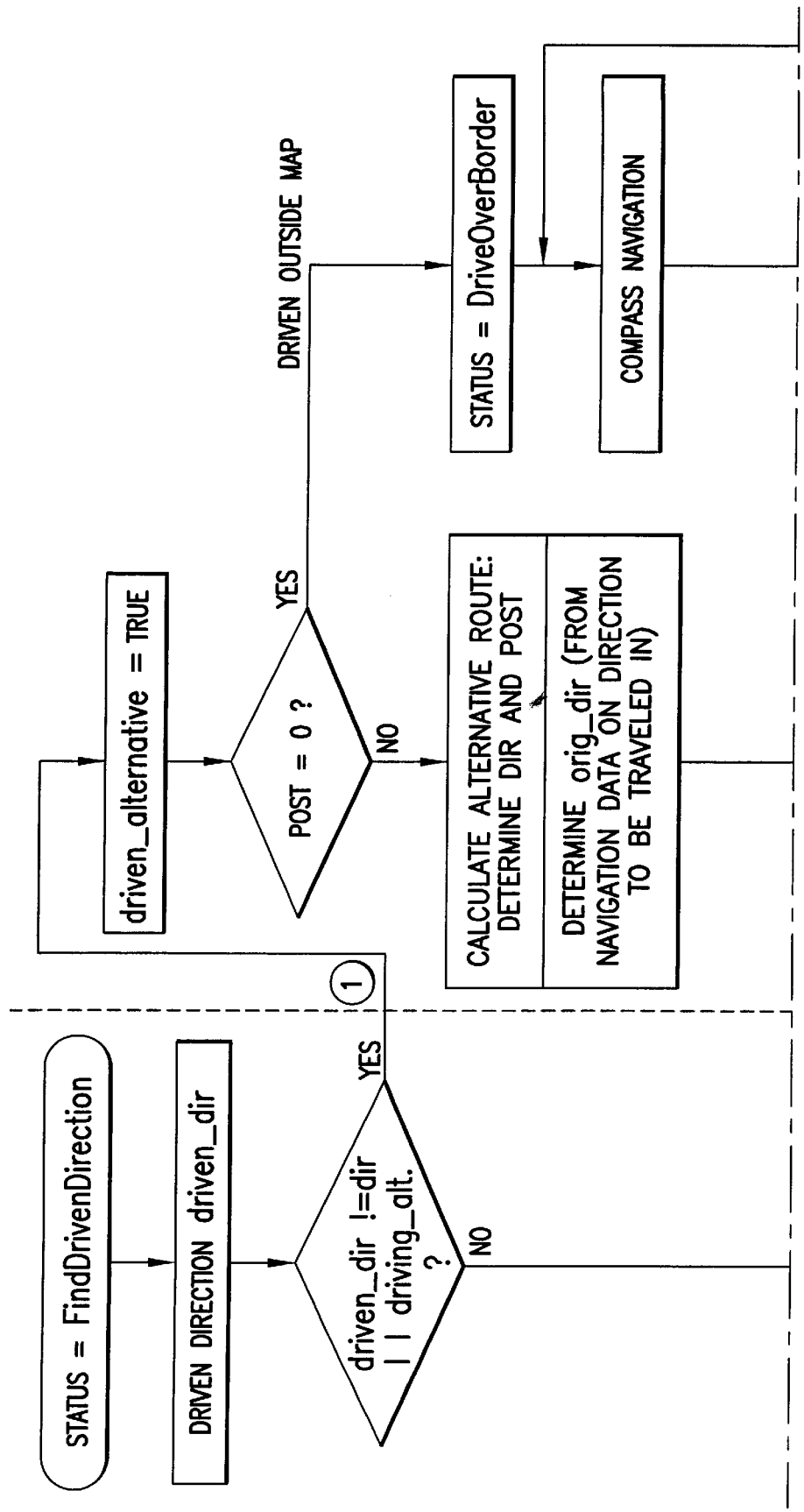

| FIG.27A |
|---------|
| FIG.27B |

| FIG.28A |
| FIG.28B |

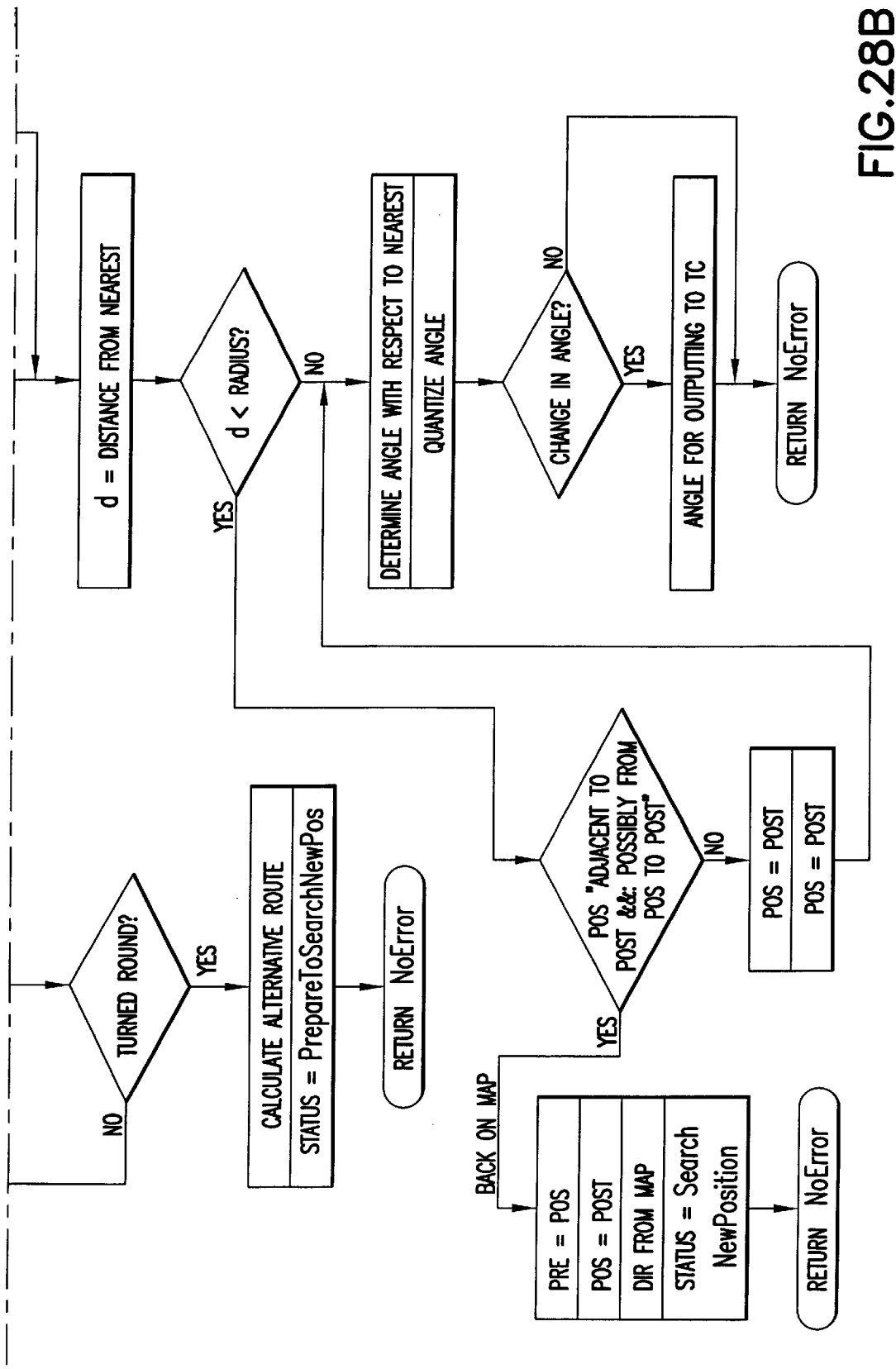

METHOD FOR NAVIGATING AN OBJECT

BACKGROUND OF THE INVENTION

1. Field of the Invention

The invention relates to a method for navigating an object in accordance with the preamble of Patent claim 1. In said method, the object is navigated starting from a starting point to a destination along traffic routes which are contained in an electronically stored traffic route map.

2. Description of the Prior Art

Routing or navigation systems are used, for example, to direct a driver with his motor vehicle to his destination in the best way possible. Different navigation systems differ in this respect. Those of the first generation are autonomous. They merely have digitized traffic routes or road maps on CD-ROM and do not have a connection to traffic information services or service providers. For this reason, their route calculations cannot be optimized with respect to the current traffic conditions. Other disadvantageous factors are the relative speed with which the street maps become out of date and the necessity of having to obtain the appropriate data carriers whenever one wishes to drive to new, more remote regions.

In navigation systems with so-called "off-board" routing, the calculation of the route is exported to a service provider. Thus, for example, a driver has the route dynamically transmitted to him after he has input his destination. The exporting of the calculation of the route and of the data material required for it has a number of advantages. Thanks to the service provider's access to information from an extremely wide variety of sources which he can coordinate and interconnect centrally, the service provider is able to include immediately in the calculation of the routes current traffic reports, congestion forecasts, information on road works and the weather etc. In addition, the service provider can keep his data stock (digitized road maps, information on hotels, sights, public buildings etc.) more up to date and has access to relatively large quantities of data and more computing power than terminals (as cheap as possible). In this way, the driver can be guided on a route which is dynamically optimized to the respective current peripheral conditions. In addition, the procurement of new updated CD-ROMs is dispensed with. The traffic processes are thus optimized and traffic flow is made more efficient, reliable and less damaging to the environment.

It has proven a disadvantage with the two methods described above that, in order to calculate the route from the starting point to the destination, a relatively large amount of data management has to take place, and thus a large computing capacity and computing time are required.

3. Objects of the Invention

The invention is based on the object of specifying a method for navigating an object, which can be used to calculate routes more quickly using less computing power.

The way of achieving the object set is specified in the characterizing part of Patent claim 1. Advantageous refinements of the inventions can be found in the subclaims.

BRIEF SUMMARY OF THE INVENTION

A method according to the invention is distinguished by the fact that the traffic routes contained in the electronically stored traffic route map are provided with routing points. These routing points contain not only information, for example in the form of a vector, on their actual geographic position (length, width) but also information on the course (for example course of the roads) lying in their vicinity, and the directions along which it is possible to navigate or drive. The routing points thus greatly facilitate the navigation and reduce the computational work which it requires.

According to a very advantageous development of the invention, the routing points are assigned routing values which, starting from the destination, either only increase or only decrease as the distance from said destination grows larger, the object being navigated using the routing values which only decrease or only increase.

The routes are calculated according to the inventive method starting from the destination in the manner, as it were, of a propagating wave with routing values.

In the process, the destination is assigned, for example, the routing value 1, while all the routing points which, viewed in the direction in which the route runs, are directly adjacent are assigned the routing value 2. The last-mentioned routing points which are directly adjacent in the direction in which the route runs are then assigned the routing value 3, and the destination is now eliminated out etc. The routing values can thus be used to guide the object starting from any position in the traffic route map. To do this, the closest routing point with the lowest routing value is used as the direction indicator because this point lies closest to the destination. The method could in principle also be implemented in such a way that it is started with a relatively high routing value at the destination, which then decreases to lower values. In this case, the navigation would take place from the starting point to the destination in the direction of increasing routing values.

The provision of the routing points with the routing values which either only increase or only decrease can be implemented relatively easily and quickly with the result that the route can be calculated in a short time and with only a small amount of computing power. The data record which is necessary for the navigation itself after the route has been created is, furthermore, relatively small, with the result that its management also requires only a small amount of computing capacity and storage capacity.

The method according to the invention can therefore also be implemented advantageously in first-generation navigation systems, provided that the traffic route maps stored on the CD-ROMs are provided with routing points. The routes can be calculated relatively quickly and with little computing power, with the result that relatively cheap terminals can be used. This applies also with respect to the fact that the data record calculated for navigation is relatively small, with the result that it also requires only a small amount of storage capacity.

However, owing to this relatively small data record which represents the calculated route, it is also possible to apply the method according to the invention advantageously even if the "off-board" routing which has already been described at the beginning, in which the route is calculated by the service provider, is carried out. In this case, the calculated route must be transmitted from the service provider to the navigation system of the object which is to be navigated, which can now be carried out relatively easily, for example over a telephone link, owing to the small amount of data for the calculated route.

Apart from digital voice transmission, mobile radio also provides various possible types of data transmission, and it is now available with virtual complete coverage. Thus, the data which relate to the navigation, in this case the route calculated by the service provider, can be transmitted to the customer using an existing telephone by means of, for example, the GSM short message service SMS. Because the amount of data to be transmitted is relatively small, calling the calculated route from the service provider to the customer does not constitute a considerable cost factor, especially since the transmission of data does not require a continuous data link. The use of the method according to the invention could thus be attractive even if parts of its execution take place at the service provider end.

The method according to the invention can in principle be implemented to navigate any desired objects along traffic routes. As already mentioned, the objects can be motor vehicles which are capable of detecting their actual geographic position, for example using a GPS receiver which is carried along.

However, the objects of the type in question may also be mobile phones themselves if they are capable of detecting their actual geographic position, for example by surveying their position using a plurality of surrounding base stations. In this case also, the route calculated in advance between the starting point and the destination could be transmitted over the radiotelephone link from a service provider to the mobile phone and stored there, because the data record describing the route is relatively small, and thus can easily be buffered in the mobile phone. The user of the mobile phone could then carry out navigation in, for example, an optimum way using the display device of the mobile phone.

In the method according to the invention, according to one refinement of the invention the routing points are permanently assigned to the traffic routes, with the result that the provision of the routing points with routing values can be carried out in a simple way and relatively quickly, resulting in a relatively short computing time for the generation of the desired route. The routing points can be positioned here in the vicinity of the points where traffic routes intersect and in the vicinity of sharp bends or bends in the traffic routes. A plurality of routing points which are located one behind the other can be positioned distributed along relatively long junction-free sections of traffic routes.

If the routing points are allocated by a service provider, routing points may also be allocated temporarily, for example in the vicinity of diversions, owing to road works, accidents etc. which are set up for a limited period of time. The assignment of the routing values to the routing points is preferably made on the basis of route elements, which means that initially the routing points are provided with routing values only along part of the route lying between the destination and starting point, and then the next part of the route from the point lying closest to the destination to the starting point etc. In this way it is possible to ensure that, from any desired point on the traffic route map, a route element with the desired descending or rising sequence of routing values is always obtained in the direction of the destination.

According to another refinement of the invention, the routing values are assigned to the routing points taking into account the type of traffic route in the vicinity of the respective routing point. As a result, it is possible to take into account the fact that, in the case of one-way streets, it is possible to travel in one direction only etc.

The type of traffic route itself is determined in the vicinity of a respective routing point by means of a multidimensional vector which comprises not only branching and road-use possibilities in the respective directions but also contains information on the respective street name, the routing value (the navigation information) which is relevant in the direction of the destination and the actual geographic coordinates of the routing point. Such a vector ensures that the object will be routed reliably.

According to one development of the present invention, the size of the map excerpt is determined by the positions of the starting point and destination. The map excerpt comprises here not only the relatively close vicinity of the starting point and of the destination but also a respective region between the two points which is, for example, in the form of a tube and which can be implemented with a greater or lesser width. The width of this tube-like region and the size of the regions respectively surrounding the starting point and destination can be preset or selected by the user of the navigation system. However, the routing points have to be provided with the routing values only for the selected regions, and not for the entire traffic map, with the result that this is also a reason why only a relatively short time and small amount of computing power are required to generate the navigation route.

According to another development of the invention, when the object leaves the map excerpt, a new map excerpt is, for example called automatically, in which the routing values are assigned to the routing points with respect to the old destination and a new or instantaneous starting point, with the result that it is now also possible once more to navigate the object in the direction of the destination.

As an alternative to this, when the object leaves the map excerpt, a compass navigation back to the old map excerpt may also take place. When the object enters said old map excerpt, it is then possible to navigate again by reference to the routing values.

BRIEF DESCRIPTION OF THE DRAWINGS

Exemplary embodiments of the invention are explained in detail below with reference to the drawing, in which.

DETAILED DESCRIPTION OF THE INVENTION

The surroundings of the car driver have changed in the last few years. Nowadays, in many new vehicles stand-alone navigation systems can be found next to the car radio. The owner of the vehicle often also has a mobile phone with him. However, using these newly added systems while driving has now been found to constitute a risk factor for road users. For this reason, in order to increase driving safety, the mobile phone can, for example, be permanently installed with a hands-free system and connected to the radio. Thus, the driver's concentration is distracted virtually no more than by a conversation with the occupants of the vehicle, because he neither has to look for the mobile phone nor pick it up in his hand. Voice recognition systems which permit all user functions such as the dialling of numbers, acceptance of an incoming call etc. are already available.

A logical extension of the development is a communications and transport system for intelligent transport systems which connects all the electronic components to one another and can easily be configured for the given peripherals.

Figure 1:
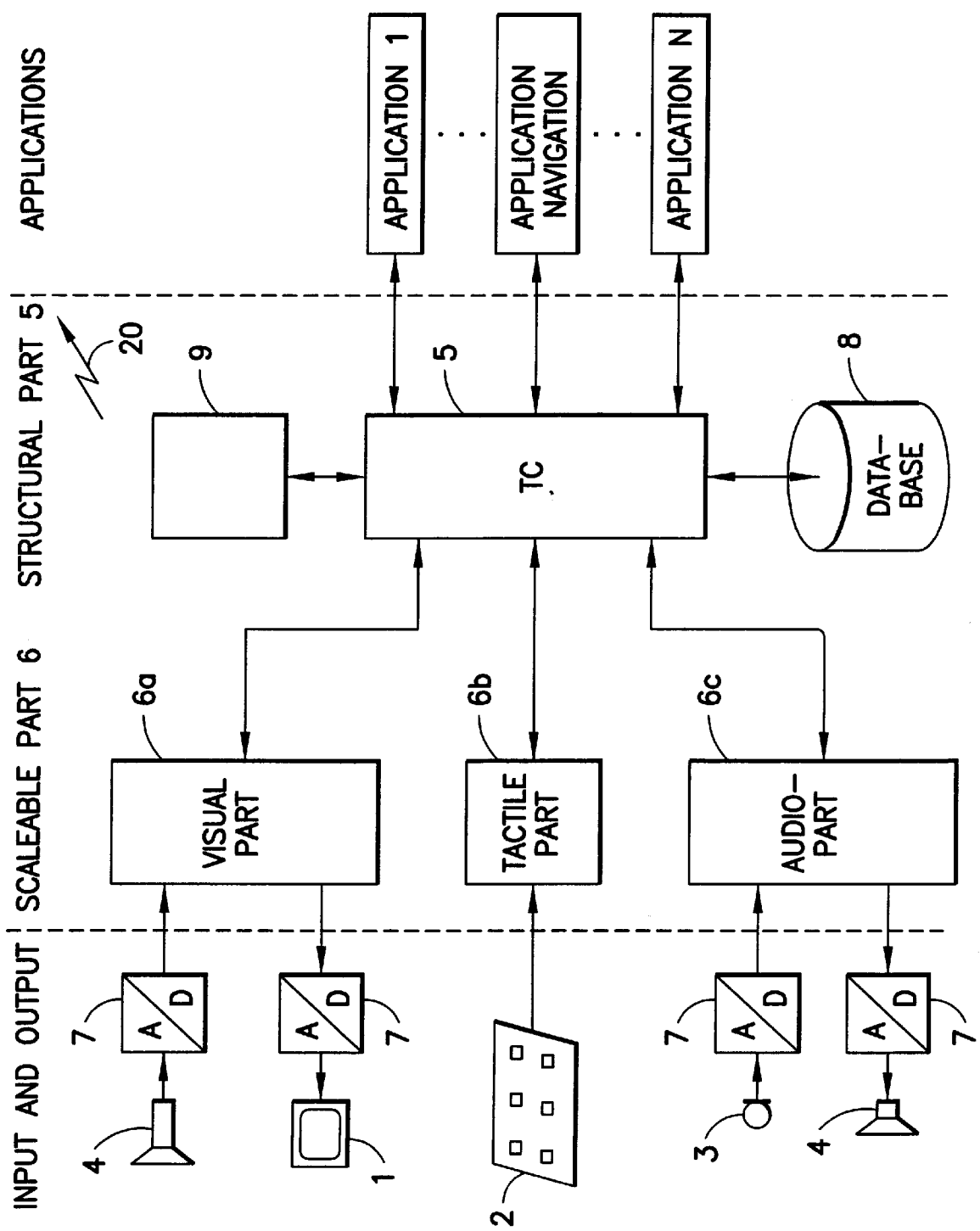
FIG. 1 shows a block diagram of a configurable user interface UI.

In this field, developments have included, inter alia, a dynamic user interface UI which simplifies the control of mobile telematic applications in a car and is shown in FIG. 1. The system will in future permit car drivers to use other services apart from making telephone calls. For example, manual and automatic emergency calls and calls to the breakdown services, traffic information, information systems, vehicle position-finding and anti-theft systems or dynamic routing will thus be possible. The primary features of the user interface UI are the modular treatment of the input and output devices and the simple configuration of the hardware environment in order to enable the car industry to use a flexible range of products. In addition, concepts have been developed which combine audio and visual inputs and outputs efficiently and avoid possible conflicts between the two types of control.

The configurable or dynamic user interface UI is part of a navigation system which, in the present case, is intended to operate exclusively with GPS (Global Positioning System) or DGPS (Differential GPS). As is the case in already existing navigation systems, GPS is only. one component of the position-finding system. Wheel-mounted signal transmitters and an electronic compass can supplement the position-finding system.

The navigation system which has been developed guides the driver of the vehicle using the previously recorded map material to any desired destination by means of suitable audio-visual instructions. The navigation instructions are communicated by means of TCP/IP (Transmission Control Protocol/Internet Proto-col: a combination of protocols for transmitting data between data processing environments) to another process which is running in parallel and which manages the audio-visual output units. In selecting the current driving instruction, the program is capable of taking into account the reaction of the driver to the last driving instruction generated, ensuring that the driver is continuously guided to the destination despite possible incorrect actions taken on his part.

In addition, the navigation system was conceived in such a way that the driver of the vehicle can be directed to the destination with minimum expenditure in terms of data. As a result, it is possible to carry out the calculation of the routes, i.e. the generation of the digital map and the relevant navigation information, in a decentralized fashion at a mobile-radio service provider. Thus, the need to provide local computing power in the vehicle to determine the route and a storage medium such as a CD-ROM for the road map is eliminated. For navigation, the hardware requirements are reduced to a GPS receiver and a mobile radio terminal. The user interface UI performs the function of connecting the hardware components and the interface to the user.

The centrally stored general map can be maintained and updated. In addition, the service provider can make use once more of information relating to the route (traffic jams and forecasts of traffic jams, information on roadworks and road closures etc.) and take this information into account in the calculation of the route. The respective excerpt of the map is transmitted to the customer's telephone by the mobile-radio provider after the calculation, for example using the GSM (Global System for Mobile Communications) (Short Message Service) SMS. The quantity of data for this excerpt should be as small as possible in order to minimize the transmission time, and thus the customer's costs. However, the information content of the map must be sufficient for problem-free navigation, which also allows for possible incorrect actions taken by the driver.

So that even persons without background knowledge can easily generate the map material, a simple method for inputting and storing the data required for navigation has been developed.

Figure 2:
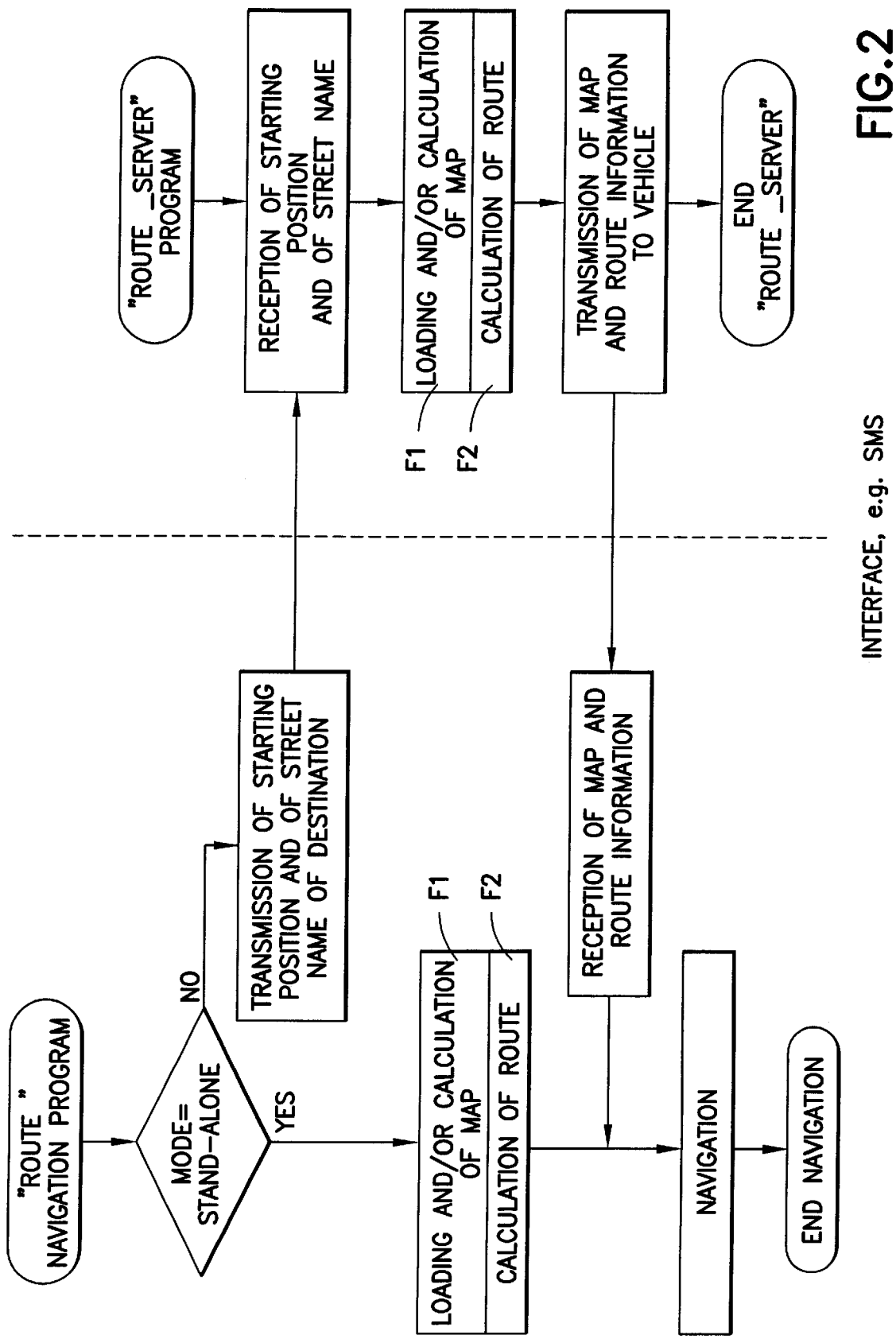
FIG. 2 shows two methods of operation for calculating maps and routes.

The configurable user interface according to FIG. 2 will be described below in more detail. This configurable user interface UI (User Interface) permits modular treatment of the input and output devices and simple configuration of the hardware environment. It recognizes the various devices which are connected, such as graphic displays 1, control elements such as keys 2, audio input and output devices 3, 4 etc. and can communicate with them.

Connected applications 1, . . . N, such as the NAV navigation system which has been developed with a GPS receiver for supplying geographic position information data or with programs for making available traffic information, make their functions available to the user interface UI, but do not communicate with the user. They therefore do not receive any direct inputs or pass on any results directly to the user. The communication with the user is carried out via the user interface UI and its input and output devices. The control is menu-prompted and intuitive, the dialogues are easy to understand and free of contradictions. The inputs can be made by means of voice or keys in any situation.

The output can be in the form of voice or graphics. The voice output here is a good way of supplementing the visual output. The instructions and/or questions can be understood by the user without visual contact. If the user has not understood the voice output, or has forgotten it, he can retrace this output using the graphic interface. For this reason, both forms of output must be combined efficiently and contradictions must be avoided.

In addition, the user interface UI contains a voice recognition system in order to provide the recognized user with personal services and settings. In addition, it makes available a device for outputting in voice form both foreign texts and texts from the user's own country. This is a convenient way of providing the user with messages.

The block diagram of the user interface in FIG. 1 shows that the user interface UI is mainly composed of two components, specifically the structural part 5 and the scaleable parts 6. The latter, 6a, 6b, 6c, communicate with the input and output devices 1–4 via A/D converter 7. Among other things, they adapt the output to the conditions.

The structural part 5 passes on the enquiries from the applications 1, . . . , NAV, . . . , N to the relevant scaleable part 6. In addition, a database 8, in which all the equipment-specific and user-specific data are stored, is connected to said scaleable part 6. This structural part is composed essentially of a task controller (TC) 5. The task controller 5 is also connected to a mobile phone 9, via which a radio link 10 to a service provider is established. Via this radio link, the data which relate to the navigation are transmitted to the customer using the existing telephone 9 and the GSM short message service SMS. It is preferable here to transmit the required data once. These data contain, firstly, the map excerpt which is required for navigation, including relevant secondary roads which permit the driver to be guided continuously to the destination even if he takes incorrect actions. Secondly, supplied together with this map is information with which the navigation program, with the name "route" can generate the appropriate instructions for the driver and thus guide him to the destination.

If the driver leaves this map excerpt which is provided in the car, the user can choose between two navigation alternatives. Firstly, it is possible to request a new map which corresponds to the current area. Secondly, he can be directed back into the known area by means of a compass navigation procedure which indicates the direction to be taken, supported by the GPS position. In the latter case, the customer does not need to request a new map and he does not incur any further costs.

Within the scope of the present invention, by virtue of two files there are two methods of operation of the "route" navigation program which allows the user to choose between independent operation of the program —a so-called stand-alone mode—or communication with the program "route_server". FIG. 2 shows an overview of this.

The stand-alone operating mode is to be understood as the integration of functions F1, F2 for loading the map and for calculating the route into the navigation program. It is thus not necessary to exchange data with the service provider because the "route" program can access the map material and the route-calculation function directly.

The data is exchanged using the method of operation of bidirectional communication of the two programs by means of files, for example using the SMS. Communication with the SMS can therefore be considered as being equivalent to the mode of bidirectional data transmission using two files from the "route" program to the "route_server" program.

For the calculation of the route and later navigation it is necessary to know the area of roads which are to be travelled on, together with the area's junctions and intersections and the traffic regulations. The respective direction instructions have to be placed in numerical relationships. In addition, the geographic position information must be stored.

In order to achieve this goal, the real area of roads, at least the roads which can be travelled on, must be projected onto a virtual, idealized map. The points which are relevant for positions are junctions and intersections at which the driver can select between different driving directions. The lines which are produced between said junctions and intersections correspond to the roads. Each line is provided with a number at the points of intersection; for long roads it is possible to introduce intermediate points. In addition, numbers are assigned to the existing names of the roads or streets.

A number of examples are given below in order to clarify pictorially the process of allocating points, including to special cases. In the examples, the numbers of the points are assigned as desired. In one closed map they cannot be present more than once.

Figure 3:
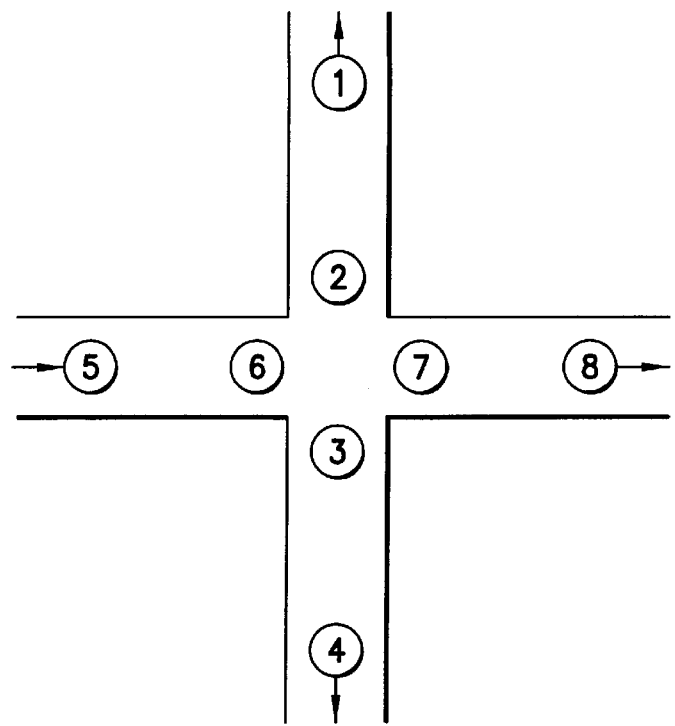
FIG. 3 shows the allocation of points at an intersection.

The normal situation in road traffic comprises junctions where one road leads into another, or intersections. FIG. 3 shows an exemplary intersection. The roads leading off are provided with any desired numbers.

In order to indicate which points are connected to one another, a vector with the adjacent points is created for each number. This vector therefore characterizes the type of traffic route in the vicinity of a routing point which will be described later. So that the direction information can be protected without further expenditure in terms of data, the numbers are listed in the mathematically positive sense, starting with the right-hand point. The last entry in this point vector is always the point lying "at the back". This originates from an adjacent intersection and is indicated here with an arrow. Table 1 shows the point vectors of the exemplary intersection from FIG. 3. All the direction information of the intersection is stored in the point matrix which is produced.

TABLE 1

The Point matrix of an intersection

| Point | On right | Straight ahead | On left | At rear |
|---|---|---|---|---|
| 2 | 6 | 3 | 7 | 1 |
| 3 | 7 | 2 | 6 | 4 |
| 6 | 3 | 7 | 2 | 5 |
| 7 | 2 | 6 | 3 | 8 |

Figure 4:
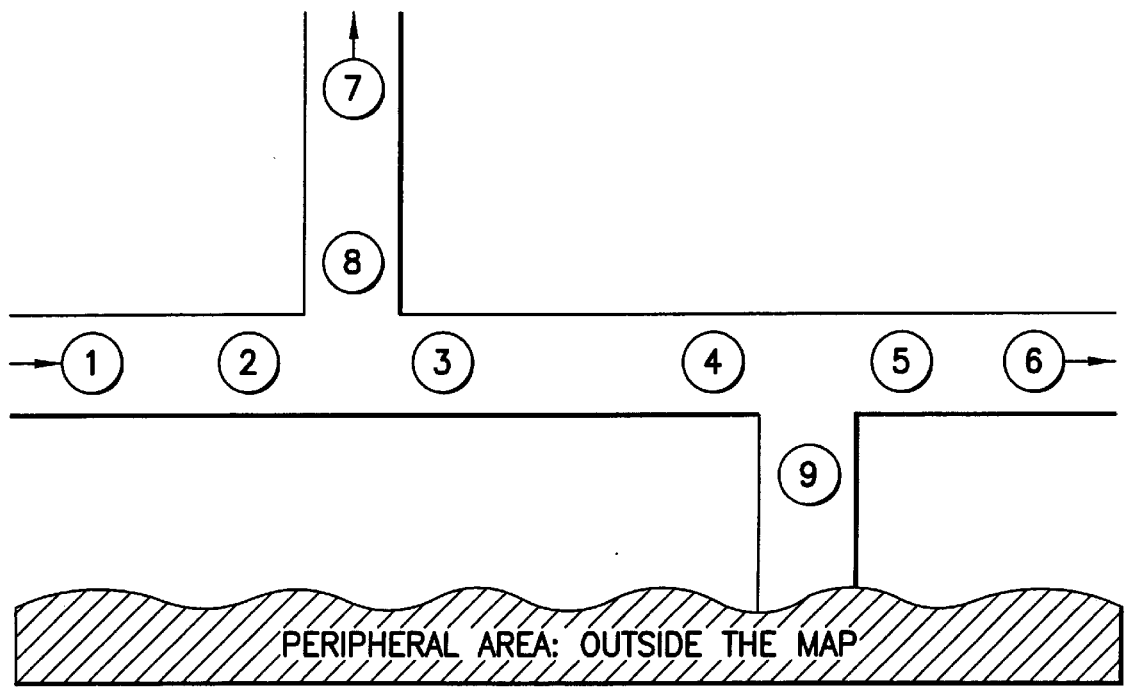
FIG. 4 shows the allocation of points at a junction and at the edge of the map.

The allocation of points at junctions where one road joins another or simple junctions is comparable with that for intersections. FIG. 4 shows the allocation of points for junctions where one road joins another and for peripheral points.

In a junction where one road joins another, there is one road less in comparison with an intersection. The missing connection is indicated by inserting a 0. If a road leads to the edge of the map (point 9), a 0 "at the back" indicates this clearly. This can be seen in Table 2.

TABLE 2

The point matrix for FIG. 4

| Point | On right | Straight ahead | On left | At rear |
|---|---|---|---|---|
| 2 | 0 | 3 | 8 | 1 |
| 3 | 8 | 2 | 0 | 4 |
| 4 | 9 | 5 | 0 | 3 |
| 5 | 0 | 4 | 9 | 6 |
| 9 | 5 | 0 | 4 | 0 |

Figure 5:
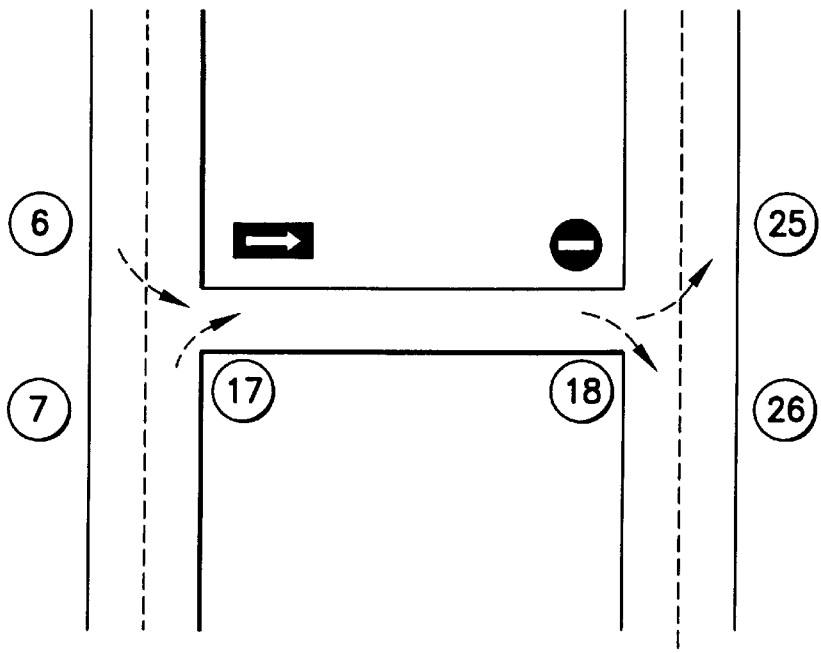
FIG. 5 shows the allocation of points on a one-way street.

A one-way street can only be travelled along in one direction. Because the program must be aware of the existence of this road for the later calculation of routes, this information must be stored in the map in some way. The solution is clarified using FIG. 5.

The introduction of negative numbers in the matrix defines the prohibition of turning off a road. The variable for turning off a road to the left in point 26 is negative: −18. This specifies that a road is present on the left, but that it is not permitted to give an instruction for it. By looking through Table 3 it is possible to see how the system can be applied to the other points. Because the points outside the intersection are not relevant here, they are kept open in the table with an x.

TABLE 3

The point matrix of a one-way street

| Point | On right | Straight ahead | On left | At rear |
|---|---|---|---|---|
| 6 | 0 | 7 | 17 | x |
| 7 | 17 | 6 | 0 | x |
| 17 | −6 | 0 | −7 | 18 |
| 18 | 26 | 0 | 25 | −17 |
| 25 | −18 | 26 | 0 | x |
| 26 | 0 | 25 | −18 | x |

Figure 6:
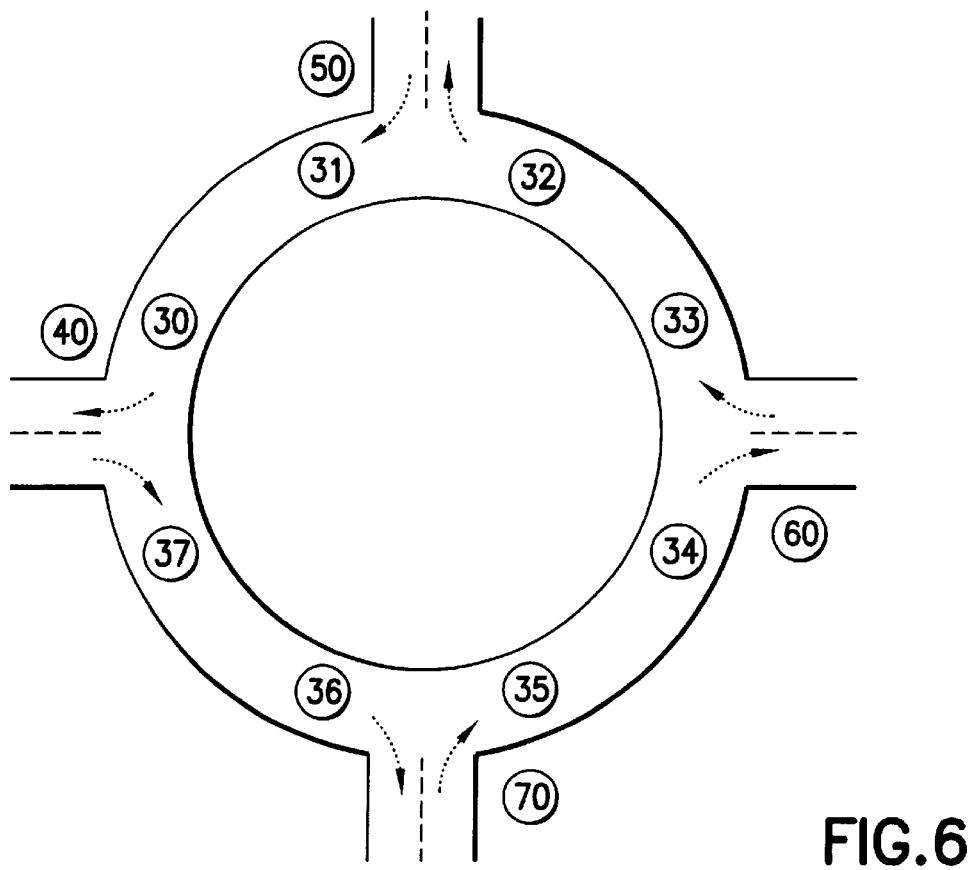
FIG. 6 shows the allocation of points at a roundabout.

In the system used, roundabouts can be considered to be one long continuous one-way street. Each entry and exit is conceived of as an intersection. This will be clarified using the roundabout in FIG. 6 and its matrix in Table 4.

TABLE 4

The point matrix of a roundabout

| Point | On right | Straight ahead | On left | At rear |
|---|---|---|---|---|
| 30 | 40 | 37 | 0 | −31 |
| 31 | 0 | −32 | −50 | 30 |
| 32 | 50 | 31 | 0 | −33 |
| . | . | . | . | . |
| . | . | . | . | . |
| . | . | . | . | . |
| 37 | 0 | −30 | −40 | 36 |
| 40 | 37 | 0 | −30 | x |
| 50 | 31 | 0 | −32 | x |
| . | . | . | . | . |
| . | . | . | . | . |
| . | . | . | . | . |

Figure 7:
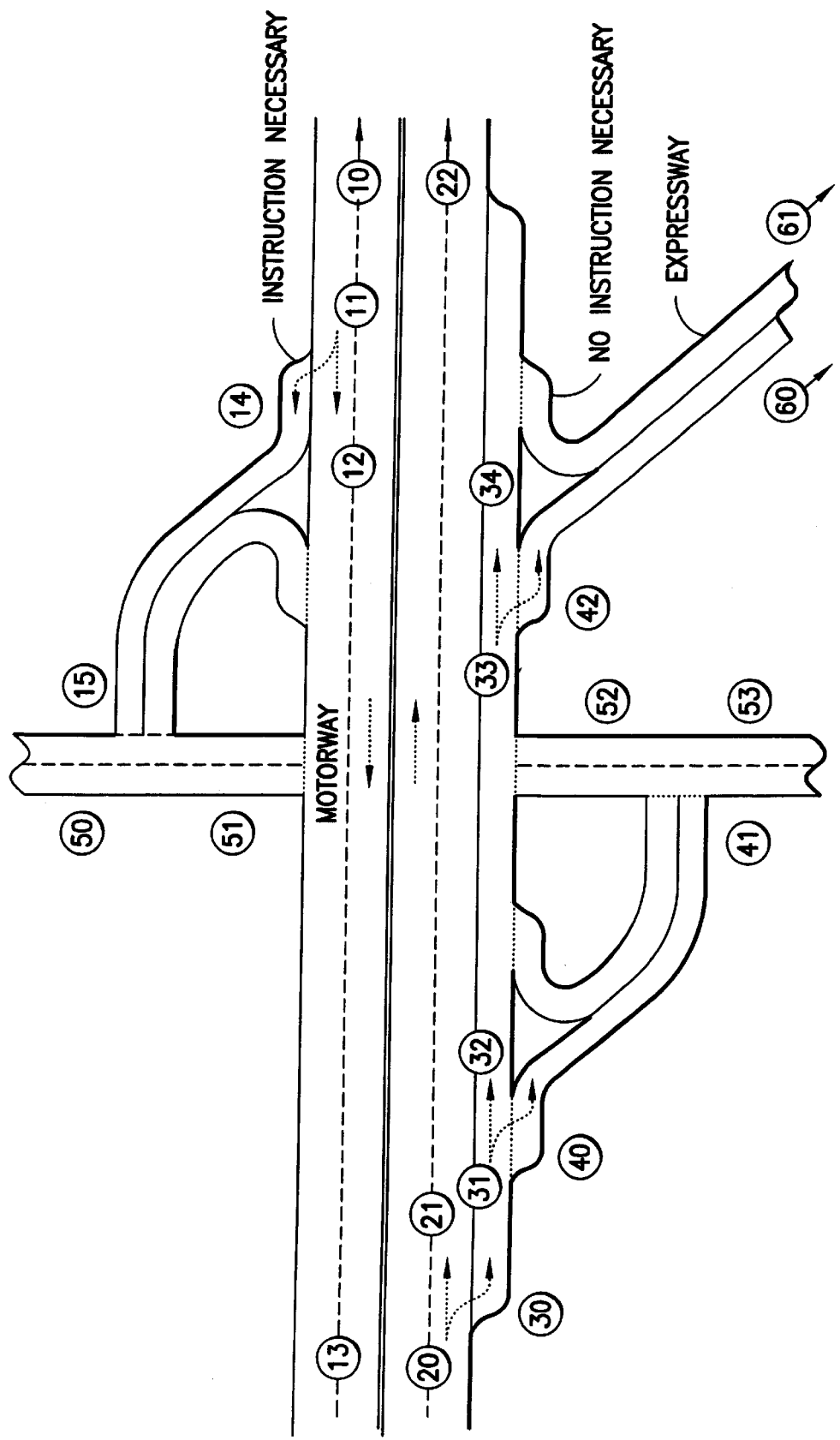
FIG. 7 shows the allocation of points on motorways.

In the case of urban expressways and motorways, the carriageways are structurally separated from one another. It is thus impossible to turn off to the left or turn around. For this reason, both directions of travel can be independent one-way streets running in opposite directions and can be programmed accordingly. In addition, in the case of motorways, only the exits need to be indicated with points. On the approach slipways, the driver only has the possibility of driving straight ahead. An instruction here would make no sense and unnecessarily disturb the driver. FIG. 7 shows at which positions the driver can commit actions, thus requiring points to be allocated.

During the navigation, the instruction to turn off to the right must be given earlier than on a normal road, specifically at the start of the slowing-down lane at the latest. Instructions relating to travelling straight ahead, possibly for long periods, should be omitted on motorways. For these reasons, and further reason explained later, the presence of a motorway must be clearly visible on the map. In order to achieve this, free variable is used for turning off to the left, which, for German maps, would always be with 0. This is equivalent to the inverted, right-hand point. This is impossible on normal roads because each point can occur only once. It is thus possible to characterize a motorway without an additional variable. The programming operations for FIG. 7 can be found in Table 5. By analogy with one-way streets, the directions in which it is not permitted to drive should also be made negative here. The points which are not known for this example and which therefore lie outside the illustration are again replaced by an x.

TABLE 5

The point matrix for motorways

| Point | On right | Straight ahead | On left | At rear |
|---|---|---|---|---|
| 10 | x | x | x | 11 |
| 11 | 14 | 12 | −14 | −10 |
| 12 | −14 | −11 | −14 | 13 |
| 13 | x | x | x | −12 |
| 14 | −12 | 0 | −11 | 15 |
| 15 | 50 | 0 | 51 | 13 |
| 20 | 30 | 21 | −30 | −x |
| 21 | −30 | −20 | −30 | 22 |
| 22 | x | x | x | −21 |
| 30 | −21 | 0 | −20 | 31 |
| 31 | 40 | 32 | −40 | −30 |
| 32 | −40 | −31 | −40 | 33 |
| 33 | 42 | 34 | −42 | −32 |
| 34 | −42 | −33 | −42 | 22 |
| 40 | −32 | 0 | −31 | 41 |
| 41 | 53 | 0 | 52 | 33 |
| 42 | −34 | 0 | −33 | 60 |
| 50 | 0 | 51 | 15 | x |
| 51 | 15 | 50 | 0 | 52 |
| 52 | 41 | 53 | 0 | 51 |
| 53 | 0 | 52 | 41 | x |
| 60 | x | x | x | −42 |
| 61 | x | x | x | 22 |

A further particular feature is, as already indicated, the approach slipway. Here, it is not uncommon for drivers to take incorrect actions. In addition, there is an instruction to turn off to the right if, in the conventional sense, the exit has been programmed "at the rear", which makes no sense. It would be impossible to locate the coordinates of the "intersection" of the motorway approach slipway because they would have been recorded at the start of the slowing-down lane. For this reason, the point 40 cannot be programmed at point 41, for example. However, at point 41 during the navigation it must be known which exit is to be taken. In order to achieve this, the variable for the entry to the motorway indicates the closest, reachable exit in positive terms. For this purpose, the number 33 must be programmed at the "rear" of point 41. On the other hand, point 33 can only point back to one point although it is possible to program two points (32 and 41). It is agreed that it points back to point 32 in negative terms, it being theoretically possible to program point 41.

Figure 8:
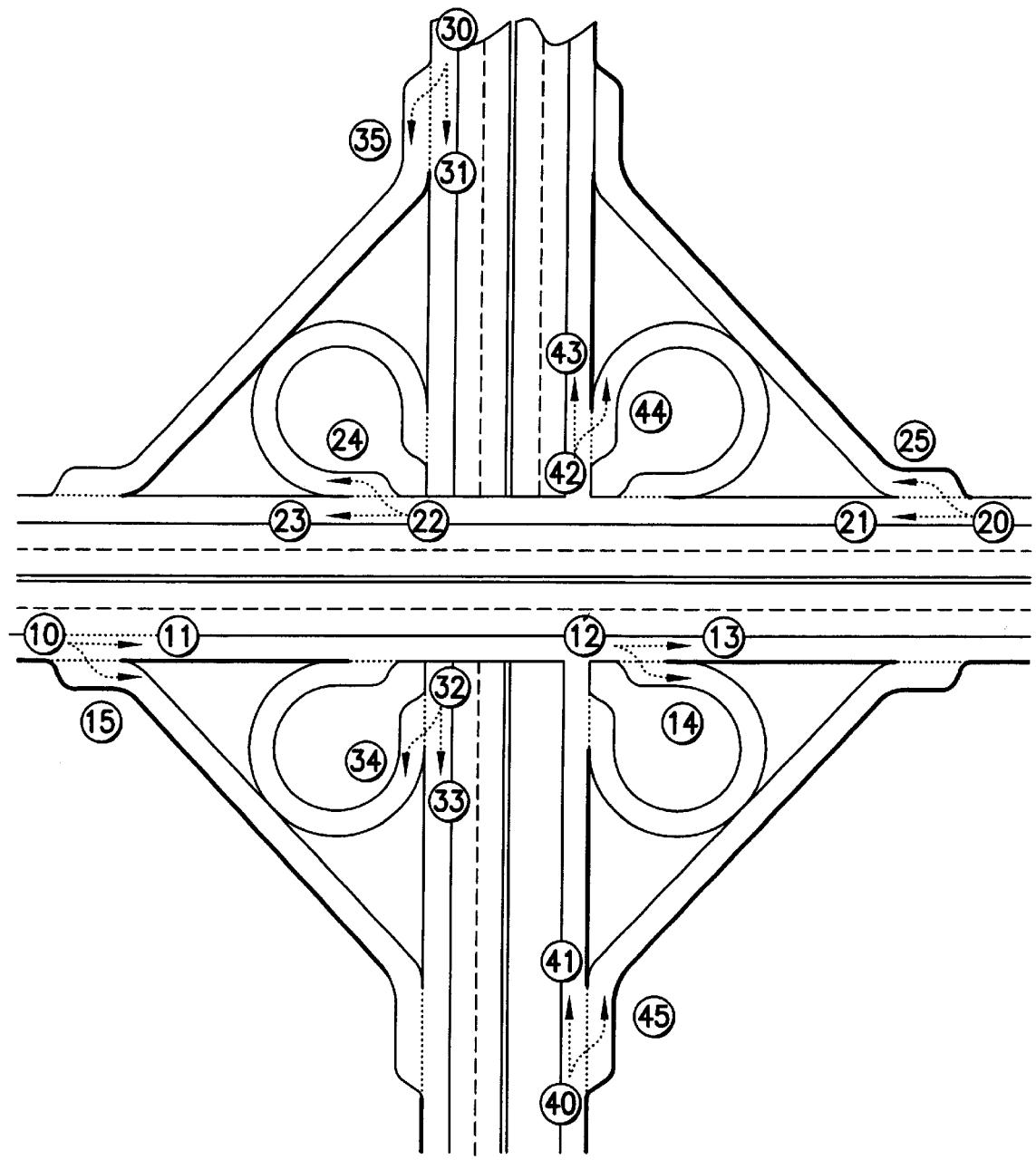
FIG. 8 shows the allocation of points on motorway intersections.

An intersection between motorways is merely a succession of motorway entry slipways. In the case of the motorway intersection in FIG. 8, all the points at which the driver has to make a choice between different actions are provided with the respective points. Table 6 is intended to document the assignment of the point vectors.

TABLE 6

The point matrix of a motorway intersection

| Point | On right | Straight ahead | On left | At rear |
|---|---|---|---|---|
| 10 | 15 | 11 | −15 | −x |
| 11 | −15 | −10 | −15 | 12 |
| 12 | 14 | 13 | −14 | −11 |
| 13 | −14 | −12 | −14 | x |
| 14 | −13 | 0 | −12 | 42 |
| 15 | −11 | 0 | −10 | x |
| 20 | 25 | 21 | −25 | −x |
| 21 | −25 | −20 | −25 | 22 |
| 22 | 24 | 23 | −24 | −21 |
| 23 | −24 | −22 | −24 | x |
| 24 | −23 | 0 | −22 | 32 |
| 25 | −21 | 0 | −20 | x |
| 30 | 35 | 31 | −35 | −x |
| 31 | −35 | −30 | −35 | 32 |
| 32 | 34 | 33 | −34 | −31 |
| 33 | −34 | −32 | −34 | x |
| 34 | −33 | 0 | −32 | 12 |
| 35 | −31 | 0 | −30 | x |
| 40 | 45 | 41 | −45 | −x |
| 41 | −45 | −40 | −45 | 42 |
| 42 | 44 | 43 | −44 | −41 |
| 43 | −44 | −42 | −44 | x |
| 44 | −43 | 0 | −42 | 22 |
| 45 | −41 | 0 | −40 | x |

Figure 9:
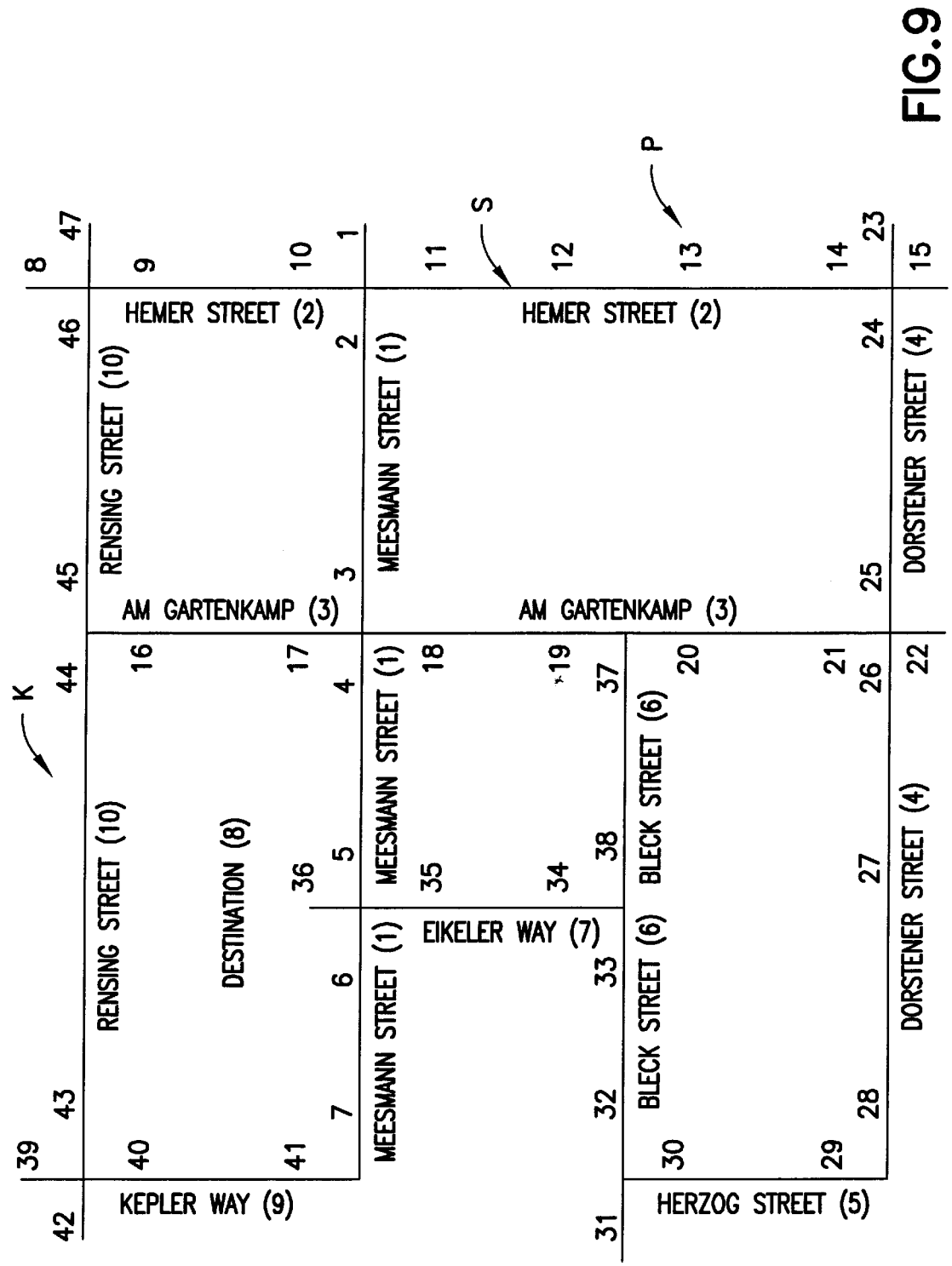
FIG. 9 shows an example of an idealized road map.

FIG. 9 shows the example of an idealized road map k. The numbers of the roads S, on which details will be given below, are given after the street names in brackets. The vector of the point P or routing point contains not only the surrounding points which have already been described but also the number of the associated street name and the two-dimensional GPS coordinates, i.e. the degrees of longitude and latitude of the point. If a street name has not been entered for this point, because it constitutes, for example, a point outside the map and should therefore not be travelled along, a −1 is entered here as a designation for the street.

Taken together, the vectors produce a matrix which contains all the relevant information on the real map which is input and with which it is possible to calutate routes. An exemplary matrix, which describes part of the map from FIG. 9, is shown in Table 7.

TABLE 7

Exemplary matrix of an idealized map

| Point | On right | Straight ahead | on left | At rear | Road | Latitude | Longitude |
|---|---|---|---|---|---|---|---|
| 1 | 10 | 2 | 11 | 0 | 1 | 5131.0757 | 712.0444 |
| 2 | 11 | 1 | 10 | 3 | 1 | 5131.0757 | 712.0444 |
| 3 | 17 | 4 | 18 | 2 | 1 | 5131.0789 | 712.0123 |
| 4 | 18 | 3 | 17 | 5 | 1 | 5131.0789 | 712.0123 |
| 5 | 36 | 6 | 35 | 4 | 1 | 5131.0811 | 711.9967 |
| 6 | 35 | 5 | 36 | 7 | 1 | 5131.0811 | 711.9967 |
| 7 | 41 | 0 | 0 | 6 | 1 | 5131.0779 | 711.9772 |

TABLE 7-continued

Exemplary matrix of an idealized map

| Point | On right | Straight ahead | on left | At rear | Road | Latitude | Longitude |
|---|---|---|---|---|---|---|---|
| 8 | 46 | 9 | 47 | 0 | −1 | 5131.0269 | 712.0426 |
| 9 | 47 | 8 | 46 | 10 | 2 | 5131.0269 | 712.0426 |
| . | . | . | . | . | . | . | . |
| . | . | . | . | . | . | . | . |
| . | . | . | . | . | . | . | . |
| 46 | 9 | 47 | 8 | 45 | 10 | 5131.0269 | 712.0426 |
| 47 | 8 | 46 | 9 | 0 | 10 | 5131.0269 | 712.0426 |

The matrix described above is recorded, together with the points of the map, using a special "prog_card" program. When the points are entered, they are checked and the relationships between the points are examined. These relationships will be clarified using the exemplary map from FIG. 9.

Points which lie opposite one another—as here, for example, point 1 and point 2—normally have the same side streets. Thus, the point 10 is to the right of point 1. In the case of point 2, point 10 is the left-hand one etc. In addition, the information that point 1 and point 2 are opposite one another, is contained in both points.

If one of these relationships is infringed, the program gives a warning. This is intended to protect the programmer of the map against inputting errors. In the case of motorways or urban expressways, these warnings must be ignored because points are intentionally entered in duplicate in these cases.

In addition, the program contains a number of inputting aids, like the outputting of the points already programmed, the listing of the free points which are still to be used or the points which are still to be programmed. The inputting of the points and these aids will be described later.

After the inputting of the points is terminated, the names of the streets are allocated.

After the start of the "prog_card" program, the described matrix of the idealized map is firstly recorded. The interface which appears is represented as follows:

Program your points . . .

Point number:

Instructions:

r (ready: name the streets)
q (quit without saving !)
s (save the points)
l (load existing card)
v (view the points)
t (to do)
f (free points)
? . . . (Neighbouring points of point . . .)
or the number of a point to program it . . .

The point which is to be stored is input first, i.e. point 1 of the exemplary matrix from Table 9. The request to input the point on the right then appears. As is clear in the matrix, this is point 10. The point (2) lying opposite, the point (11) on the left and the point "at the rear", here zero, are input in the same way. The screen mask which has now been produced can be seen in the following figure.

After the points have been input, the relationships with the surrounding points (10, 2, 11) are examined, and the warnings which may be present are output. In the case of an inputting error, the faulty point is overwritten. For this reason, inadvertent overwriting is prevented here with an additional interrogation.

```
Program your points . . .
                       Instructions:
Point number: 1
                       r (ready: name the streets)
Right: 10               q (quit without saving !)
Straight on: 2          s (save points)
Left: 11                l (load existing card)
Backwards: 0            v (view the points)
                        t (to do)
                        f (free points)
                        ? . . . (Neighbouring points of point . . .)
                        or the number of a point to program it . . .
```

If the first part of the program has been exited after the points have been input, the associated street names for the points can now be input. In the case of driving instructions, it is thus possible not only to give the direction information, such as "Please turn right immediately", but also to integrate the associated street name into the instruction. Thus, the instruction "Please turn right into . . . " is produced.

For the inputting operation, "prog_card"0 searches for associated roads. In the exemplary map from FIG. 9, the program first interrogates the name of the road from point 1, because this is a peripheral point.

If this road is, for example, still part of the "Meesmann Street", this can also be indicated here—as can be seen in the following figure. "Meesmann Street" then receives the number 1 from the program. In the data field of point 1, the 1 is stored as street number as a reference to the name "Meesmann Street".

```
You've programmed 47 points, now name the streets . . .
Instructions:
q (quit with saving points and streets)
s (save points and streets)
n (show named streets)
u (undo: rename the last street)
v (view the points)
? . . . (Neighbouring points of point . . . )
or the name of the street . . .
Name street on point 1: Meesmann Street
```

The name of the connecting street from point 2 to point 3 is then interrogated. Because this is identical with the previous input, to make it easier it can be performed using the "Return" key. The 1 is also stored in the data field of points 2 and 3 as a reference to the name "Meesmann Street". The same procedure can also be adopted for the street names from point 4 to 5 and from point 6 to 7.

The next input request will be the street name of point 8. Here, the street name will not be input because an instruction to drive into the peripheral area is not expected, and the quantity of data can thus be reduced. A specific number, the −1, is assigned to this nameless street as a reference.

If the input "Herner Street" is then made in response to the request for the street name from point 9 to point 10, this street is assigned the number 2. The street name from point 11 to point 14 is then interrogated, because point 12 and point 13 are only auxiliary points for navigation and do not entail a change of the street name.

If all the points are assigned to one street name, the program recognizes this and expects a file name for the storage of the input data. A preset file name—for example the file name of the map which has already been loaded—can also be accepted here using the "Return" key.

A number of practical instructions for the generation of the digital map will be given below.

At the start of the allocation of points, the process should not be begun directly with 1 as the first number because usually there are also points at the starting point—which will probably be programmed first later.

As far as possible the points should be input in a closed fashion because the inputting operation when allocating the street names can be terminated quickly using "return", and the map also becomes easier to read.

After the assignment of points for a road has been finished, a number of points should be left free because, for example, secondary roads at the periphery are frequently forgotten, or roads are not entered on the map, and numbers can thus be inserted logically without difficulty.

Visibly separate areas on the map by means of high numbers: points can thus more easily be found again when inputting the road names, during later storage of the coordinates or during navigation.

A simulation file of a road element which is to be travelled along can thus be generated. It is thus possible to carry out a first navigation locally on the computer. Possible errors on the map can thus be found more conveniently.

If the map data are to be stored, a file is created in a permanently defined directory, which is indicated in a prog_card.rc configuration file, both the map matrix and the road names being stored in said created file. The upper part of the file is represented below.

```
47
1 10 2 11 0 1
2 11 1 10 3 1
3 17 4 18 2 1
4 18 3 17 5 1
5 36 6 35 4 1
6 35 5 36 7 1
7 41 0 0 6 1
8 46 9 47 0 −1
9 47 8 46 10 2
10 2 11 1 9 2
11 1 10 2 12 2
12 0 11 0 13 2
13 0 12 0 14 2
14 24 15 23 13 2
15 23 14 24 0 2
16 45 0 44 17 3
17 4 18 3 16 3
18 3 17 4 19 3
19 37 20 0 18 3
20 0 19 37 21 3
21 26 22 25 20 3
22 25 21 26 0 −1
23 14 24 15 0 4
24 15 23 14 25 4
25 21 26 22 24 4
26 22 25 21 27 4
27 0 26 0 28 4
28 29 0 0 27 4
29 0 0 28 30 5
30 32 0 31 29 5
31 30 32 0 0 6
32 0 31 30 33 6
33 0 38 34 32 6
34 33 0 38 35 7
35 5 36 6 34 7
36 6 35 5 0 8
```

-continued

```
37 20 0 19 38 6
38 34 33 0 37 6
39 42 40 43 0 −1
40 43 39 42 41 9
41 0 0 7 40 9
42 40 43 39 0 10
43 39 42 40 44 10
44 16 45 0 43 10
45 0 44 16 46 10
46 9 47 8 45 10
47 8 46 9 0 10
```

The number of points stored is given in the first line, and the following lines contain the vector of the points. The respective point is given in the first element. The following four elements contain the surrounding points, and thus the direction information. The last column contains the reference to the respective street name. If there is no name present, −1 is given here. The street names themselves are contained in the lower part of the file, which appears as follows.

```
10
 1        7 Meesmann Street
 9       15 Herner Street
16       21 Am Gartenkamp
23       28 Dorstener Street
29       30 Herzog Street
31       33 Bleck Street
34       35 Eickeler Way
36       36 NOKIA
40       41 Kepler Way
42       47 Rensing Street
```

The number of street names present is given in the first line. The numbering of the individual street names corresponds to the line number. The data in the first and second lines serve as reference points, indicating the local area in which the street is located. They correspond to the starting point and end point of the street.

In order to assign the points to the respective GPS coordinates, a program with the name "save_map" is used. After the program has been started, the map must be loaded. Here, either a file name can be entered or the preset name is accepted using "Return". The first point which is to be stored must then be entered. Here, using '1' a GPS file which has already been registered can additionally be loaded. Then all the points which are still to be stored are listed. Here, the programmer can select which point he would like to drive to first. The figure below shows the layout of the screen after both the files have been loaded. The presettings of the file names are transferred with "Return", and point 5 will be registered next.

```
File to load card (return = default):
Read 47 points and 10 street names from file
Please type in the first point you want to save (1 = load):1
File to load GPS-positions (return = default):
Read 12 GPS-positions from file
Please type in the first point you want to save (1 = load):5
```

The following figure shows the screen mask of the program for the storage of point 5. Because the identical GPS position is registered for all the points of an intersection, the GPS coordinates of the points 6, 35, 36 are also registered after the point 5 has been stored.

The upper part of the screen mask of the following figure shows general information of the GPS receiver. For example, the statusment "Fix quality: DGPS, satellites being tracked: 6" shows that a DGPS measurement with six satellites is being carried out. The currently measured position is output under this. In addition, the speed and the orientation with respect to north which are determined are represented. The parameters PDOP, HDOP and VDOP which are supplied by the GPS receiver give an indication of the accuracy of the current position measurement. The extreme values are output for the tolerances indicated below. The smaller the respective value, the more precise is the current measurement.

| | | |
|---|---|---|
| Press space bar to save GPS-position for point 5 | | (ESC or q quits) |
| | | space: |
| | | save point |
| Fix quality: DGPS, satellites being tracked: 6 | | ->: RIGHT |
| Time in seconds since last DGPS update: 2 | | <-: LEFT |
| | | UP: STRAIGHT |
| | PDOP: 2.52 | down: BACK |
| | 1.5–8.0 | |
| Position: 5131.2090 latitude | | n: next point |
| 712.1249 longitude | HDOP: 1.51 | s: save |
| | 1.0–5.0 | u: undo |
| Speed: 37.3 km/h | | t: to do |
| | VDOP: 2.01 | r: results |
| Angle: 56.6 | 1.0–5.0 | d: del street |
| | | o: one-way street |
| | | q: quit without saving |
| straight. 'Meesmann Street' (6) | | |
| left: 'Eickeler Way' (35) | | right: DEST (36) |
| To 'Meesmann Street' (5) | | |
| Drive via 'Meesmann Street' (4)... | | |
| Ready to reach new point (speed is high enough) | | |

The lower part of the screen mask shows a schematic layout of the intersection. During the registering process, the programmer can thus reassure himself that he assigns the correct points when storing the coordinates. In this case, the intersection has to be approached via point 4, Meesmann Street. This is relevant for determining the next points to be stored. After the GPS position has been transferred, the program detects the direction of travel and from the information in the map it can automatically propose storage of the coordinates of the next points which will be approached. The result of this is that the programmer does not need to enter in advance each point which is to be stored.

For error-free detection of a direction it is necessary to ensure a minimum speed. This is shown in the bottom line.

The automatic direction detection can be bypassed using the arrow keys. If the GPS position is transferred, for example, using the left-hand arrow key, the program assumes that the vehicle has turned off to the left and the points on the intersection should be registered from point 34.

If the proposed point has already been registered, a warning is issued to that effect. The next point which is to be registered can then be entered etc.

Because, as a rule, the map is programmed by means of a city map, the map material which is registered may differ from reality. Frequently, a road which is registered turns out to be one that cannot be travelled along because it is, for example, a farm track. In this case, the road must be removed from the map. If it is prohibited to drive through, but this is not yet provided for in the map material, this can be indicated with further inputs for the relevant points.

As has been described previously, a map excerpt with navigation information is transmitted to the vehicle via SMS, for example. If a map of an entire country were provided, this would be too extensive to send via SMS. An excerpt should be formed beforehand and this can be used to guide the driver from his current location to the destination.

The route must be calculated before the map excerpt is formed, and this will be explained later. If the "optimum" part of the route is known, this must be "cut out" from the map. For this purpose, a tube which includes the relevant secondary roads over a predefined radius could be placed around the part of the route in order to be able to guide the driver back onto the calculated route if he takes incorrect actions. In this context, a plurality of roads—that is to say even relatively small ones—could also be transmitted in urban areas, in particular around the starting point and around the entire target road. For long stretches of motorway, it can be assumed that the driver will not take incorrect action as quickly. For this reason, only the exits or entry sliproads need to be transmitted here.

The navigation system which, inter alia, executes the "route" program should guide the driver of the vehicle to any desired destination by means of suitable audio-visual instructions or driving instructions. The instruction is to be understood firstly as an instruction to carry out an action such as turning off to the left or to the right or to travel straight ahead, and secondly as the transmission of status information such as "Your route has been calculated" or "You have reached your destination". For the voice outputting of the instruction, a complete sentence is generated which contains not only the direction in which to travel but also the street name and the distance from the action. A possible instruction could be, for example, "Please turn off to the right into Meesmann Street in 250 metres."

In addition to the audio output, a visual instruction, for example an arrow, is output on a screen mounted in the vehicle or on a laptop which is used. In addition, the next street name and the distance from the next action is also output.

In order to avoid driving errors and to make orientation easier, up to three instructions with different distances from the TC 5 are sent per action. The configuration of the distances will also be described. The user inputs only the destination because the starting point of the navigation is the currently measured position. The destination is initially a road in the registered map.

If the "route" program is started from TC 5, that is to say a navigation is desired—initially a number of initialization processes of the software and hardware are necessary. If the initialization processes have run successfully, the starting point and the destination must be known to calculate the route. The starting point is determined by means of the current position of the vehicle. Because the destination is input by the user, the "route" program must request it from the TC 5, which then communicates with the respective processes. The starting and destination information is then communicated to the server which performs the route calculation, as is described below.

The events and/or errors in the calculations are sent back to the "route" program. Communication by means of SMS will be described below.

The actual navigation during which the driving instructions are determined and communicated to the TC 5 for outputting then begins. In addition, an error which may occur is passed on directly to the TC 5.

Figures 10, 10A:
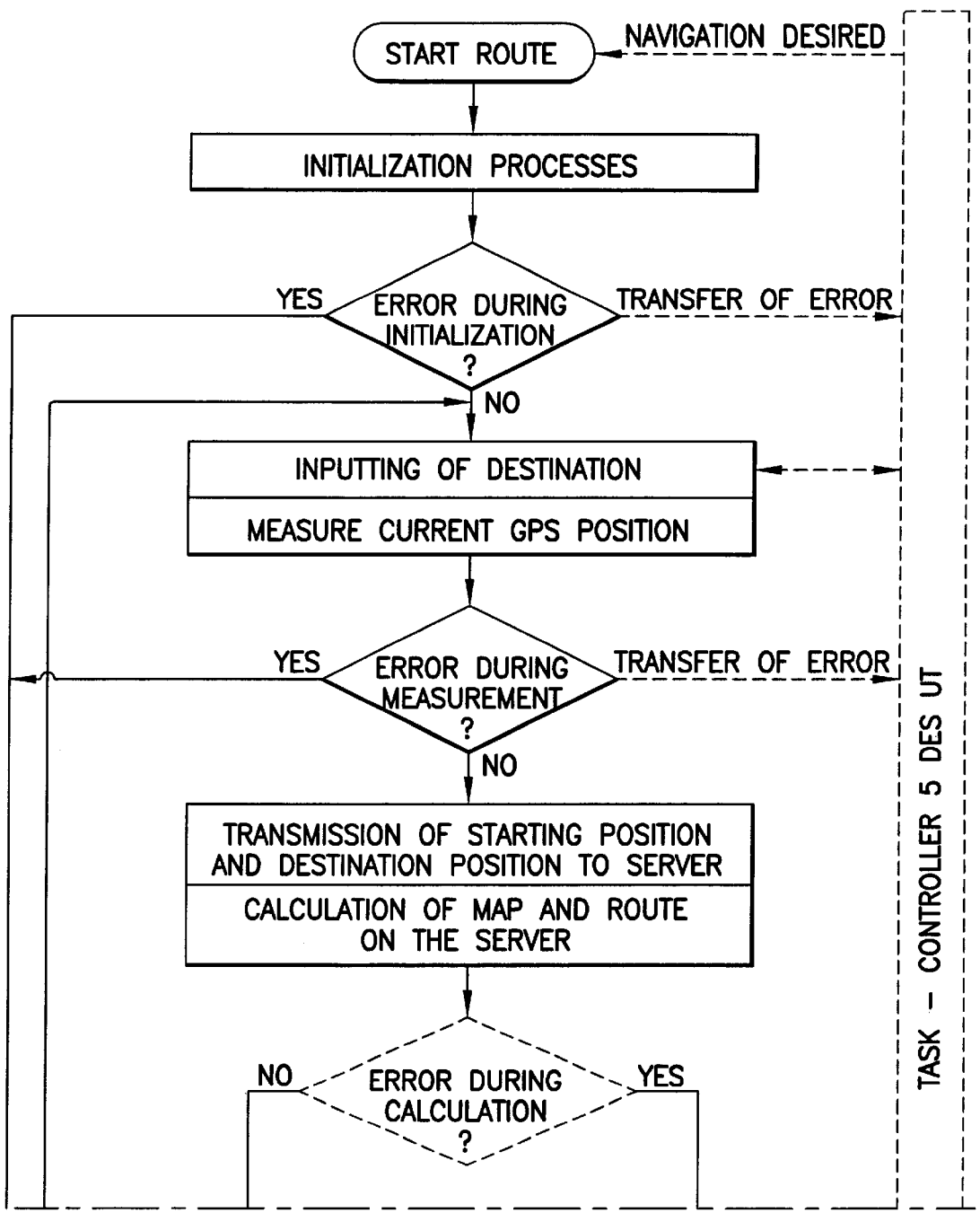
FIG. 10 shows the basic flowchart of the "route" program.
Figure 10B:
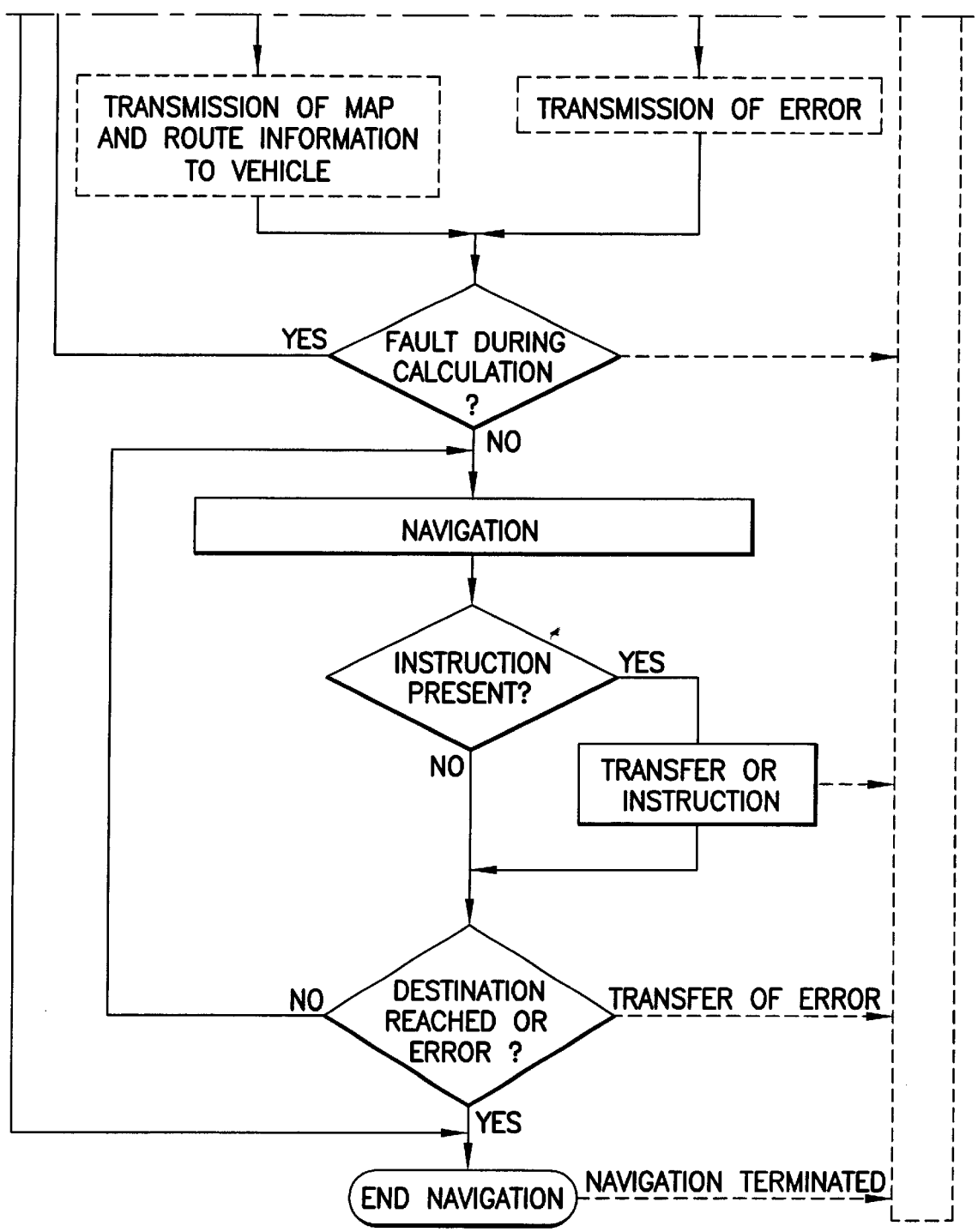

An overview of the individual initialization steps which have to be carried out by the start of the actual navigation is given in FIG. 10.

All the settings of the values which are relevant for the program and the navigation are loaded from a configuration file and can thus easily be changed by the user. Here, it is possible, for example, to choose between the outputting languages of English or German and to change the settings of the serial interface. Before the configuration file is read, all the variables are set with a predefined value in order to avoid incorrect configuration.

After storage has been reserved, the serial interface is opened. In order to ensure error-free initialization and checking of the readiness to receive of the GPS receiver, the appropriate NMEA data are read and evaluated before the route is calculated. In the GGA data record it is possible to check whether the GPS receiver is supplied with correction data via RDS.

Figure 11:
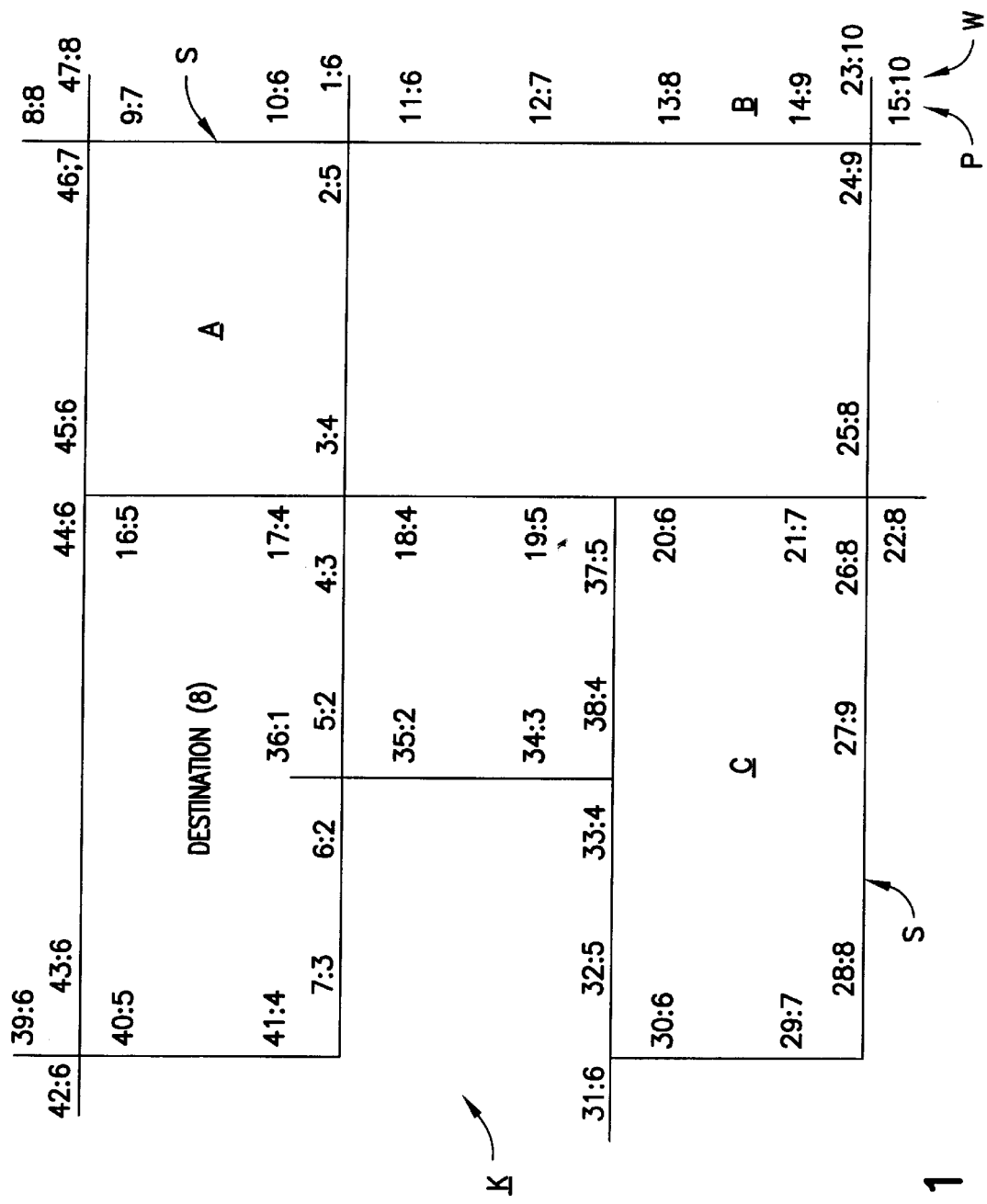
FIG. 11 shows a calculation of a route with the Lee algorithm.

In order to calculate the route, the known Lee algorithm can be used, said algorithm being applied, inter alia, in layout programs for printed circuit boards. In such a case, a wave with so-called distance increments or routing values W is propagated from the destination. The destination DEST receives the routing value 1, all the surrounding points P receive the routing value 2 etc. FIG. 11 shows the assignment of the routing values W to the routing points P of the exemplary map K according to FIG. 9. The respective routing value W is noted after the routing points P.

These routing values can be used to guide a vehicle to the destination from any position on the map. To do this, the surrounding routing point with the lowest routing value is used as direction indicator, because the latter is closest to the destination. If the vehicle is located, for example, at the starting point A which is entered on FIG. 11, the point 17 is firstly driven to, because this has the lower routing value (4). Then, the points 4 (3), 5 (2) and finally the destination point 36 (1) are headed for. At the starting point B, the destination is reached via the points 13, 12, 11, 2, 3 4 and 5.

A special case occurs at starting point C: after the points 26, 21 and 20 have been passed through, the points 37 and 19 have the same distance factor. Because, according to the route calculation, both routes are thus at the same distance from the destination, it is possible, for example, to select the instruction to drive straight ahead because it is unnecessary for the driver to turn off the road.

Figure 12:
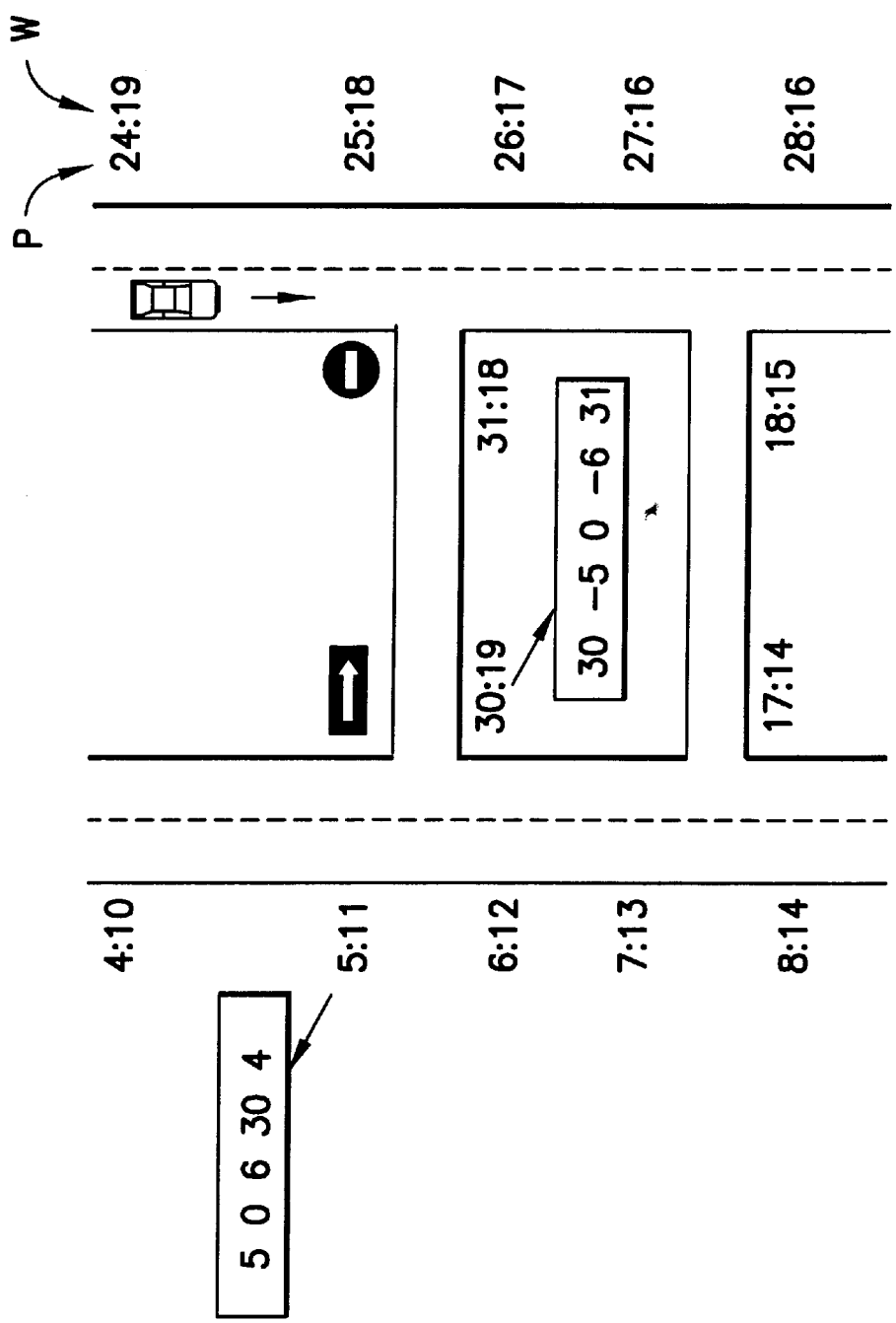
FIG. 12 shows a calculation of a route for a one-way street.

In the case of one-way streets and motorways, a separate consideration during the allocation of distance increments is necessary. Because the one-way street can only be travelled along in one direction, this must be taken into account in the distance increments. Increments of the wave must be allocated in the opposite direction to the permitted direction of travel of the one-way street because the wave is started from the destination, and the section of the route is thus travelled along in the opposite direction to the direction of travel, and thus of the later navigation. A one-way street with the respective distance increments is illustrated in FIG. 12.

In this example, the wave has arrived at increment 11 at point 5 via point 4. The surrounding points 6 and 30—point 5 already has a routing value—should now be provided with the value 12. However, because point 30 is a one-way street and points back to point 5 with a negative value, it is initially not provided with a routing value. It can only receive its routing value from point 31.

If the vehicle then travels onto the one-way street, it may not turn off to the right. This is also clear in the routing values. The right-hand point 31 has the routing value 18 and is thus equivalent to the current point 25—if the vehicle has arrived at the one-way street. The straight-ahead (26) point has the routing value 17 and is therefore preferred as direction indicator.

Figure 13:
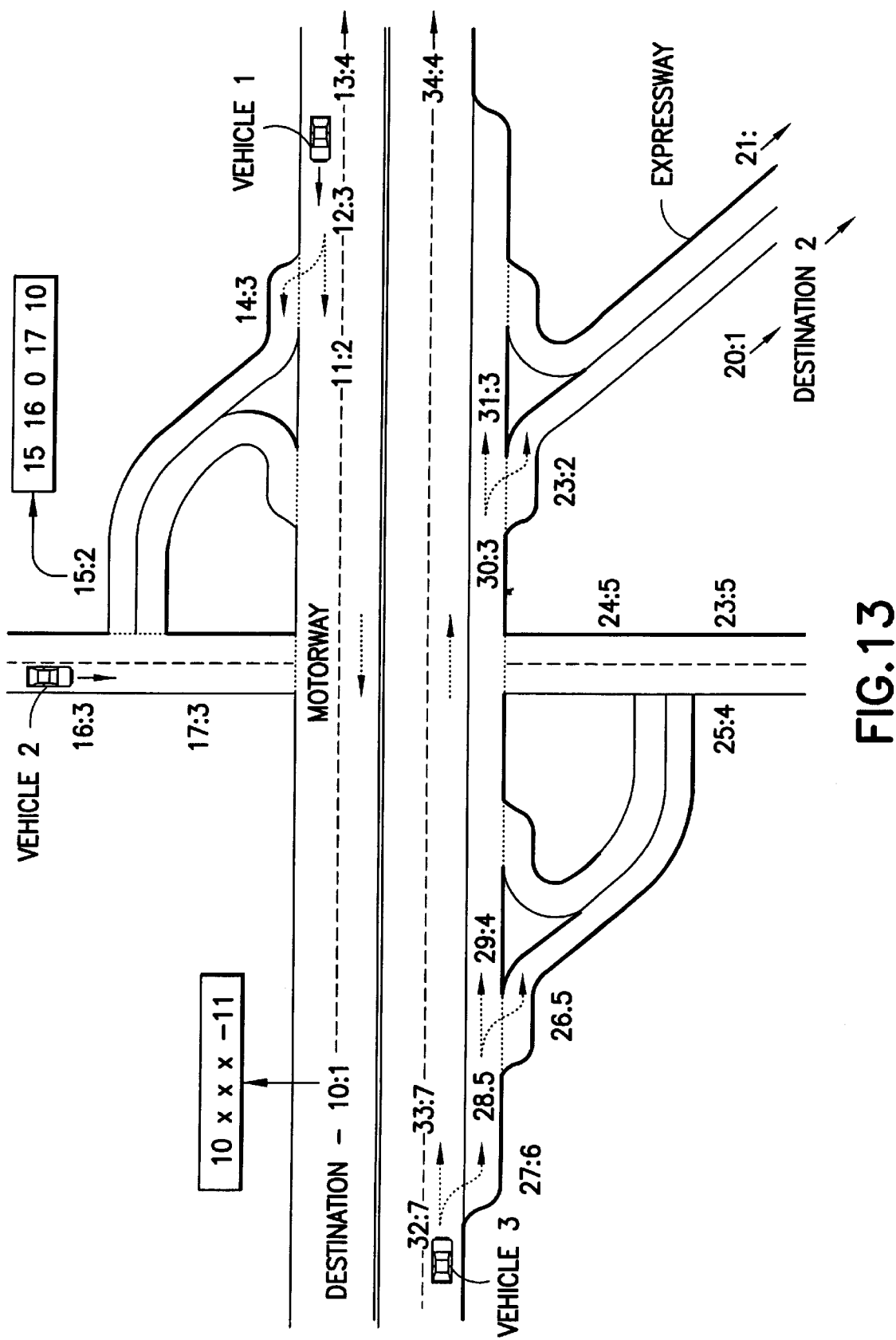
FIG. 13 shows a calculation of a route for an approach road for a motorway.

A similar procedure is adopted for motorways. FIG. 13 shows two route calculations. In the upper half there is the destination for vehicle 1, and for vehicle 2 on the left-hand side. The wave of the routing values has therefore propagated from point 10; for this reason, this point has the routing value 1 here. The point 11 receives the routing value 2 as a point lying in the vicinity of 10. The routing values of points 12, 13 and 14 are allocated in a corresponding way. In addition, during the allocation of the routing values for the motorway points—in particular in the case of point 10 here—careful attention must be paid as to whether a different, unknown point has an "at the rear" reference to the motorway. Here, point 15 points to point 10. For this reason, during the calculation of the route it is checked whether the point which allocates the next routing value for its surrounding points is a motorway. This can be detected from the absolute value of the same elements of the right-hand and left-hand variables.

If the vehicle 1 is going to reach point 12, it has the choice between driving straight ahead and turning off to the right. Because the increment for driving straight ahead is lower than the current one, the program will wish to guide the driver to the destination along the motorway.

If the vehicle 2 wished to reach the destination 1, it would have to use the motorway. This is also reflected in the routing values.

In the lower half, the destination 2 for the vehicle 3 is located underneath the expressway. Here, point 20 is selected as starting point of the wave. The routing values are allocated in a way analogous to the example above.

If the vehicle reaches point 32, the driver is requested to change to the slowing-down lane. Once this has taken place, the driver is directed straight ahead past the exit. Then, the instruction to turn off to the right is issued, after which the driver will reach his destination.

Because the destination will generally not be a point but rather a road and because there are a plurality of points located on this road, before the assignment of the routing values a route calculation will be carried out with each point on the road with respect to the starting point of the vehicle. The route calculations of the points are compared, and the point which lies closest to the staring position is accepted as destination location for the route calculation used later.

The exchange of data between the server and client will be described below, specifically for the method of operation of external calculation of the route, i.e. the exchange of data with a server. Firstly, the current position and the street name of the destination is communicated to the server in a file. In addition, an identification number is also sent, and said number will also be located in the response. A sequence composed of the date and the time can be selected as a message identifier. In this way, the client, that is to say the "route" navigation program can determine whether the map received corresponds to the requested conditions. An exemplary file is given below 100198145312 5130.892090 712.524292 DEST After the data from the "route server" program have been received, the map which is composed of the two files and the map information and the position data of the points is loaded.

An attempt is then made to assign the starting position to one of the points. The point lying closest to the direct distance is accepted as the starting point. This point is required only to determine the destination. It is not relevant for navigation because the driver can be guided to the destination from any position on the map.

The exact destination, i.e. the point on the destination street which promises to be the best possible route to the starting point, is then determined. This destination is then used to perform the calculation of the route.

The map and the result of the calculation of the route are sent back to the client. An excerpt from the example according to FIG. 9 is shown below.

```
100198145312 47 10 27 8
1 10 2 11 0 1 6 5131.0757 712.0444
2 11 1 10 3 1 5 5131.0757 712.0444
3 17 4 18 2 1 4 5131.0789 712.0123
4 18 3 17 5 1 3 5131.0789 712.0123
5 36 6 35 4 1 2 5131.0811 711.9967
6 35 5 36 7 1 2 5131.0811 711.9967
7 41 0 0 6 1 3 5131.0779 711.9772
8 46 9 47 0 -1 8 5131.0269 712.0426
9 47 8 46 10 2 7 5131.0269 712.0426
.
.
.
46 9 47 8 45 10 7 5131.0269 712.0426
47 8 46 9 0 10 8 5131.0269 712.0426
Meesmann Street
Herner Street
Am Gartenkamp
Dorstener Street
Herzog Street
Bleck Street
Eickeler Way
NOKIA
Kepler Way
Rensing Street
```

Firstly, the identification number which is identical to the request, the number of transferred points, the number of transferred street names, the starting point which has been determined and the number of the destination street are provided in the first line.

The following lines contain the information on the map and on the navigation. This line contains, in succession, the number of the point, its surrounding points (RIGHT, STRAIGHT, LEFT, BACK), the number of the street name associated with the point, the distance increment of the point (the navigation information) and the coordinates of the point.

This is followed by the street names. Their respective associated number corresponds to the position, i.e. to the line in which the name is transmitted. Thus, for example, number 2 corresponds to Herner Street.

Figures 14, 14A:
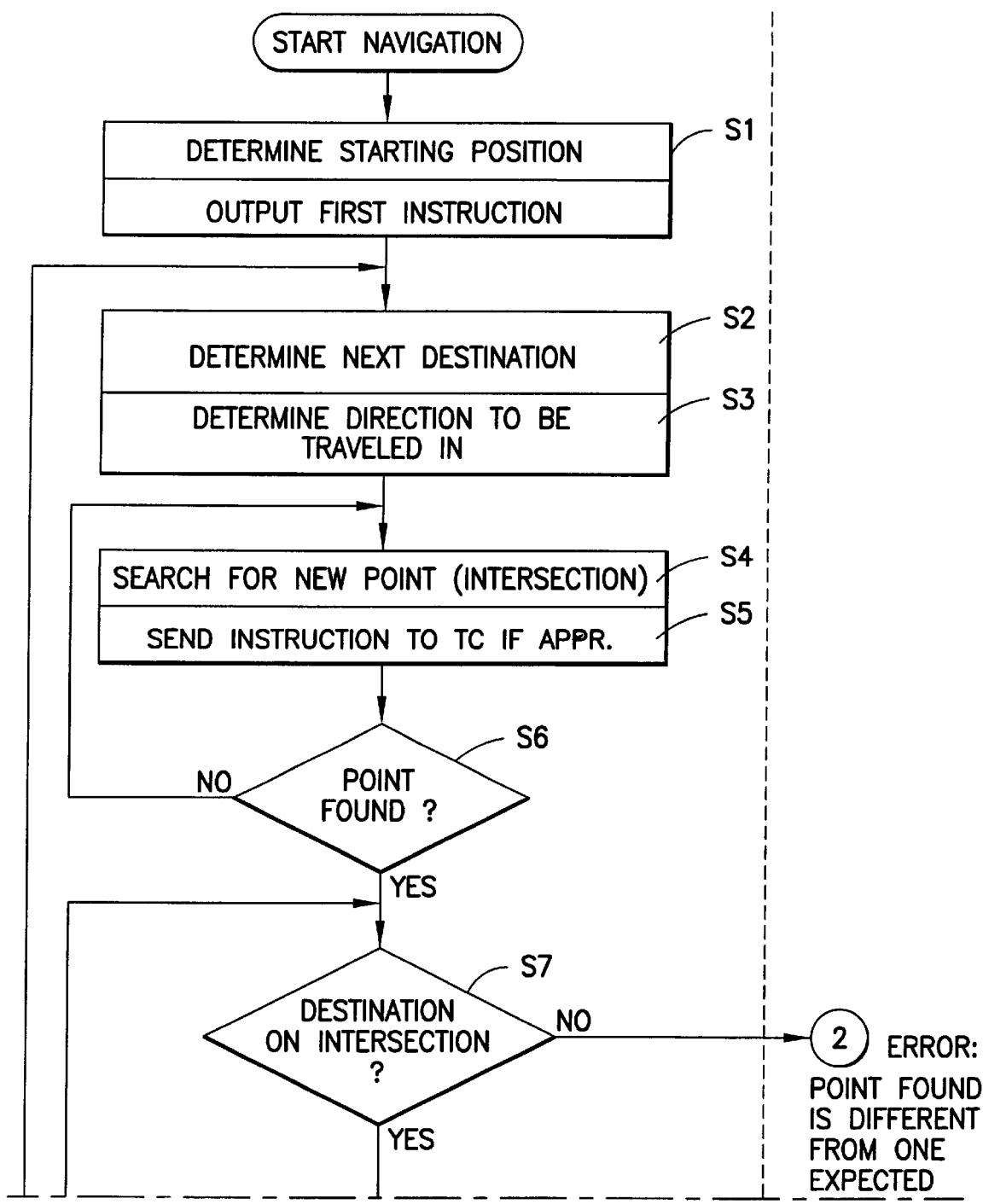
FIG. 14 shows a program flowchart for a navigation.
Figure 14B:
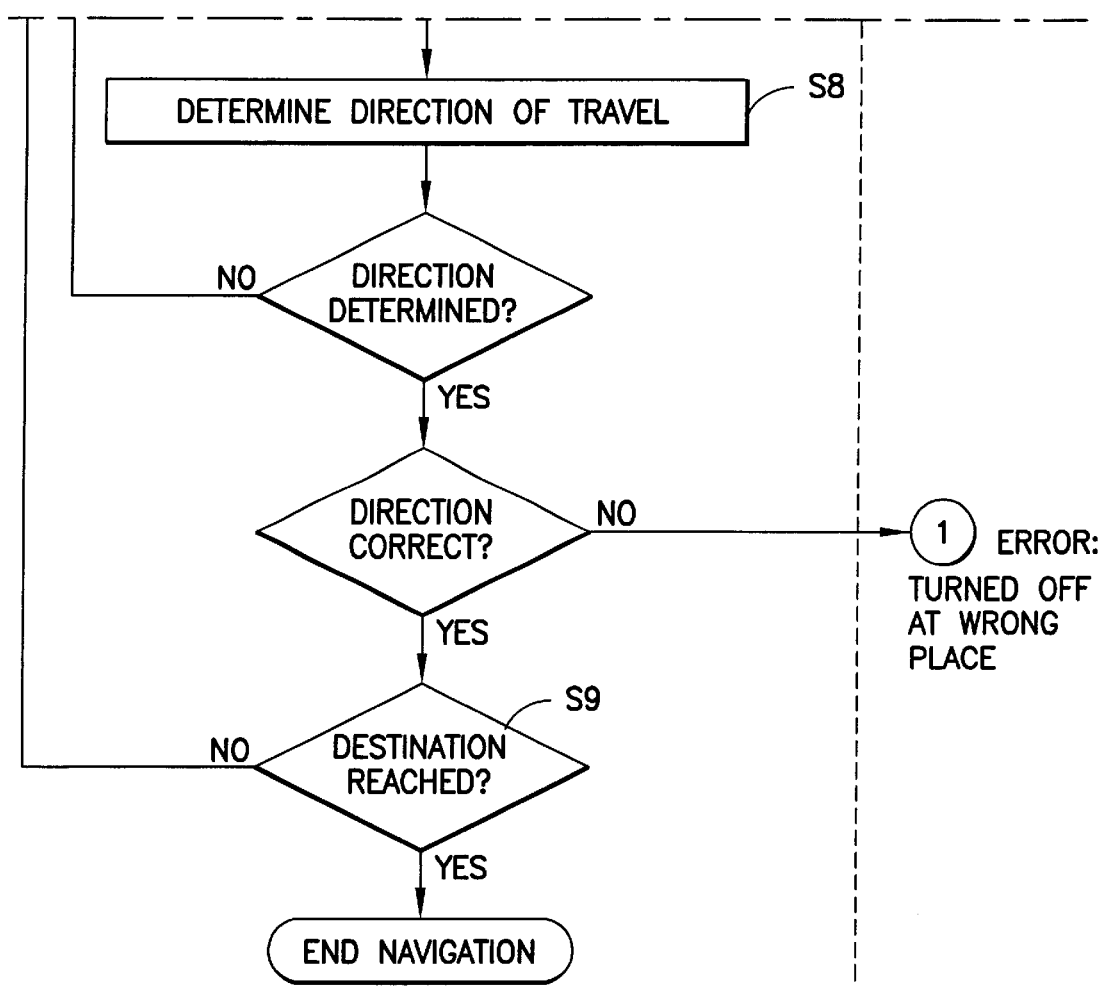

During the navigation itself, various statuses are successively passed through in accordance with FIG. 14. Thus, at the start in Step S 1 it is necessary to determine the starting position, i.e. the street on which the vehicle is located, and the direction of travel.

Once the map-related starting position has been determined, the main navigation loop begins. The main loop of this navigation operation is shown in FIG. 14. Firstly, the point which is to be driven to (the next destination) is calculated in Step S 2, and the direction to be travelled in is calculated in Step S 3.

In this status, the system waits at Step S 4 until a new point is found. Here, the distance from the intersection which is to be driven to is measured continuously and, if appropriate, an instruction is sent to the TC 5 in Step S 5. The algorithm for determining the distance will be described later.

If a point has been found in Step S 6, and the intersection identified with it is identical to the calculated intersection (Step S 7), the direction of travel can then be determined in Step S 8. This measured direction is compared with the calculated direction.

If the vehicle has turned off the road correctly, it is tested in Step S 9 whether the destination has been reached. If this is not the case, the next destination, and the distance to be travelled in, are determined at this point. If the destination has been reached, this is communicated with a special instruction and the navigation is terminated.

If the driver follows the driving instructions, keeping to the calculated route, it is the main loop shown in FIG. 14 which guides the driver to the destination. Points which are characteristic of incorrect actions are illustrated with numerals in the figure. These will be listed later.

A number of variables of the "route" program will be explained below. Table 8 lists the abbreviations used for the variables, the names of the variables in the program and an associated explanation.

The variables are contained in the program in structures. A pointer to the structures is transferred to the respective functions. Because this therefore constitutes a way of addressing the variables, they are addressed with the element identifier operator "→".

TABLE 8

The relevant variables of the "route" program

| Variable | Name in program | Explanation |
| --- | --- | --- |
| point [x] [u] | map→point [x] [u] | All the points surrounding point x |
| | point [x] [HIMSELF] | The point itself in the vector for point x |
| | point [x] [RIGHT] | Point to the right of point x |
| | point [x] [STRAIGHT] | Point straight ahead of point x |
| | point [x] [LEFT] | Point to the left of point x |
| | point [x] [BACK] | Point "to the rear" of point x |

TABLE 8-continued

The relevant variables of the "route" program

| Variable | Name in program | Explanation |
| --- | --- | --- |
| pos | pos→position | The last point passed through on map |
| pre | pos→pre_position | The last but one point passed through on map |
| post | pos→post_position | The next point on map to be driven to |
| dir | pos→orig_dir | The next direction to be travelled in at post |
| driven_dir | pos→driven_dir | The driven (determined) direction |
| street [x] | map→street [x] | Reference of point to the street name |
| streetname [x] | map→street_name [street [x]] | Street name of point x |
| post_dir | map→point [post] [dir] | The point which is reached at the next intersection after turning off |
| streetname [post dir] | map→street_name[street [point [post] [dir]]] | Street name of point post_dir |
| dest_street | map→dest_street | Number of destination street |
| x = dest | map→street [x] == map→dest_street | Reference of street number is same number as destination street? (Destination reached?) |
| status | pos→route_status | Status of navigation See Table 5.2 |

Using the series HIMSELF=0, RIGHT=1, STRAIGHT=2, LEFT=3 and BACK=4, firstly the elements of one row of the map matrix are addressed, secondly the direction information can be stored using them. In addition, the element NODIR=5 is added for compass navigation. More details will be given on its meaning later.

In Table 9, the possible statuses of the navigation—that is to say the values which the pos→route_status variable can assume—are listed.

TABLE 9

The statuses of the pos→route_status variable

| Status | Explanation |
| --- | --- |
| NoRoute | No map or route present |
| RouteIsCalculated | Calculated route is received by server |
| RouteIsCalculatedAndGaveInstr | Instruction "route is calculated" has been given |
| FindStartPosition | Determination of starting position |
| FindStartDirection | Determination of driving direction at starting position |
| PrepareToSearchNewPosition | Preparations to search for new point |
| SearchNewPosition | Search new point and give instruction if appropriate |
| SearchNewPositionAndGaveInstr | Search point, instruction has been given |
| FindDrivenDirection | Determine driving direction |
| DrivingAlternativeRoute | Calculate alternative route |
| DriveOverBorder | Vehicle has left map, Instruction "Please turn round" |
| PrepareToSearchWayHomeCoAbroad | Preparations to search for new route outside the map |
| SearchWayHomeCoAbroad | Search for new route outside the map if vehicle has not turned round |
| OrientateWithArrow | Navigation using arrow |
| ReachedDestination | Destination has been reached |

The statuses can be divided into five areas. The first area, the first three statuses, are passed through before the start of the journey. The following second area is concerned with the determination of the starting position and the outputting of the first instruction. The third area contains the statuses for the error-free navigation which is to be described below. The fourth area calls the functions which react to incorrect action by the driver. The fifth and last area is composed of just the terminating status, when the destination is reached.

The generation and transmission of the instructions will now be described.

An instruction is composed of the sentence which is intended to be used for a voice output. As a rule, it contains not only the direction and the street name which will be encountered in that direction but also the distance from the expected point. The distance is previously rounded off to an easily understandable even number. Thus a distance of 79 metres is rounded off to 70 metres, a distance of 179 metres will result in 150 metres being output, and 379 metres will be reduced to 300 metres. The rounding off not only aids understanding but is also a rough correction of the difference between the measurement of the distance and the outputting of the instruction.

At the start of the journey, the driver is instructed, with the output "Your. route has been calculated. Safe journey.", that the system is ready.

If a driving instruction then has to be issued, the instruction "Please turn off to the right (to the left) into Meesmann Street in 800 metres", for example, is generated for a given distance and a known street name. The last instruction is shortened because the driver is already located at the inter- Information which is comprehensible to the TC is given in the header line. It contains a brief description (navigation), the command (DISPLAY) which is to be executed, in this case the output, the number of messages (1), the mode of the message (HTML) and the sender (NAV for navigation).

```
<_HEAD LABEL = "Navigation" COMMAND = "DISPLAY"
NO_OF_MAPS = "1"
MODE = "HTML" SENDER = "NAV">
<_SABLE>
In 800 meters. Please turn right into Eickeler Way.
</_SABLE>
```

The instruction <_SABLE> indicates to the TC that the following message is to be passed on to the process TTS. This TTS process will subsequently reproduce the character sequence in voice form. The point after the distance information is intended to make the sentence more understandable because a brief pause is inserted here.

In addition to the audio output, a visual instruction, for example an arrow, is output on the demonstrator's screen. The following figure shows the respective HTML message and the associated header line.

```
<_HEAD LABEL = "Navigation" COMMAND = "DISPLAY" NO_OF_MAPS = "1"
MODE = "HTML" SENDER = "NAV">
<HTML>
<HEAD>
    <TITLE> Navigation Instruction </TITLE>
</HEAD>
<BODY>
    <CENTER> <H1> Eickeler Way </H1> </CENTER> <BR> <BR>
<CENTER> <IMG SRC = file:/projects/stpad/visage/sw/graphics/icons/right.gif>
</CENTER>
    <CENTER> <H1> in 800 m </H1> </CENTER> <BR> <BR>
</BODY>
</HTML>
``` section here and an immediate reaction can be expected. The instruction will simply be "Please turn off to. the right (left)".

If the direction is straight ahead, simply "Please follow the road straight ahead (for 800 metres)" is generated without a street name because this name is usually identical to the current name. In the case of the direction "BACK", the output "Please turn round as soon as possible" is given. Direction information or a street name makes no sense here.

In the case of compass navigation during which the driver is guided by means of an arrow, the single output "Please follow the arrow" indicates this to the driver.

When the driver. arrives at his destination or is about to arrive at his destination, the respective information "You have reached your destination" or "You will reach your destination in . . . metres" is output.

The voice output can be converted to English.

This navigation instruction which is present in ASCII format is transferred to another process running in parallel, the "Text to Speech" process (TTS) by Means of TCP-IP via the TC. This message which is composed in an HTML-like language (Hypertext Markup Language: A page writing language used on the WWW) is given below.

Figure 15:
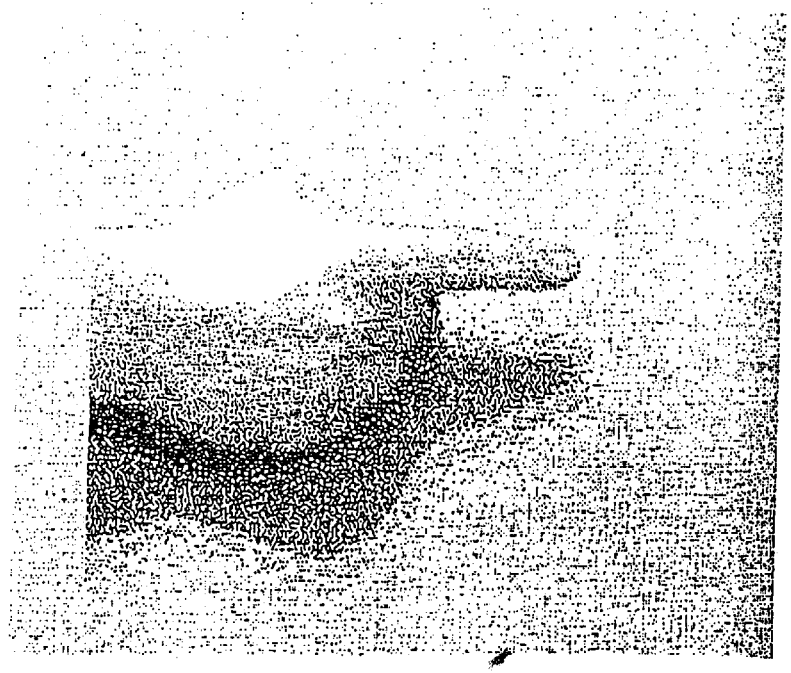
FIG. 15 shows the outputting of an item of navigation information.

After the respective header line, the information of the street name, the name of the image which is to be output and the distance from the nearest action are transferred to the NPH_DISPLAY process which manages the graphic outputs, which is comparable with the transmission to the TTS. The output implemented in the demonstrator is illustrated in FIG. 15.

The calculation of the distance will be explained below.

The GPS receiver supplies the global coordinates, i.e. the degrees of longitude and latitude, of the current position. These data made available in degrees with minutes and seconds as decimal places. In addition, the data contains the hemisphere reference for the degree of latitude—for example always N North for Europe—and the direction of the angle for the degree of longitude, W for West or E for East In order to determine the distance, the format supplied by the GPS receiver is firstly converted into a sliding decimal point value and subsequently converted into radiant. Table 10 shows the position data supplied for two registered exemplary points and their converted values.

TABLE 10

| | Conversion of degree of latitude and longitude | | | |
|---|---|---|---|---|
| | Point A: Bochum-Riemke | | Point B: Münster-South | |
| Data from GPS receiver | 5131.0792 | 712.6727 | 5155.2385 | 733.5124 |
| Data as sliding decimal point value | 51.5189 | 7.2187 | 51.9233 | 7.5642 |
| Data in radiant | 0.89917385 | 0.12598984 | 0.90623240 | 0.13202078 |

These global coordinates can then be converted into Cartesian coordinates. The relationship is reproduced in Equation 1. The degree of latitude in [rad] is designated by $\phi$, and the degree of longitude—also in [rad]—by $\lambda$. The radius of the earth R is assumed to be a constant in the rest of the calculation. For the calculations, the value 6365 km was selected.

$$x = R\cos(\phi)\cos(\lambda) \quad y = R\cos(\phi)\sin(\lambda) \quad z = R\sin(\phi) \tag{1}$$

The degree of longitude of a point, here point A, is used as a reference point. The coordinates of points in A and B are thus simplified to yield $$\vec{a} = \begin{pmatrix} R\cos(\varphi_A) \\ 0 \\ R\sin(\varphi_A) \end{pmatrix} \tag{2}$$

$$\vec{b} = \begin{pmatrix} R\cos(\varphi_B)\cos(\lambda_B - \lambda_A) \\ R\cos(\varphi_B)\sin(\lambda_B - \lambda_A) \\ R\sin(\varphi_B) \end{pmatrix}$$

The distance d can then be calculated using the absolute value of the vector $\vec{d} = \vec{b} - \vec{a}$. However, the calculation is more precise using the scalar product. The length of the circular arc can thus be calculated by means of the enclosing angle of the two vectors.

$$d = \frac{2\pi r \alpha[grad]}{360} = r * \alpha[rad] = R * \arccos\left(\frac{\vec{a}\,\vec{b}}{|a||b|}\right) \tag{3}$$

The absolute values correspond to the radius R and can thus be abbreviated after the exclusion of R in the numerator. As a result, the equation 4 is obtained for the distance d.

$$d = R*arc\,cos(x_Ax_B + y_Ay_B + z_Az_B) = R*arc\,cos(cos(\phi_A)cos(\phi_B)\,cos(\lambda_B - \lambda_A) + sin(\phi_A)sin(\phi_B)) \tag{4}$$

The map-related determination of the starting position will now be explained.

In order to create an initial condition at the start of the navigation, the position in the map, i.e. the street on which the vehicle is located, and the direction of travel of the vehicle must be determined. Because, as a rule, only the coordinates of the two end points are known for the streets, and no intermediate points have been registered, the actual course of the street is not known. It is assumed that the street is a line between the end points. The position of the vehicle will generally be next to this idealized line.

Figure 16:
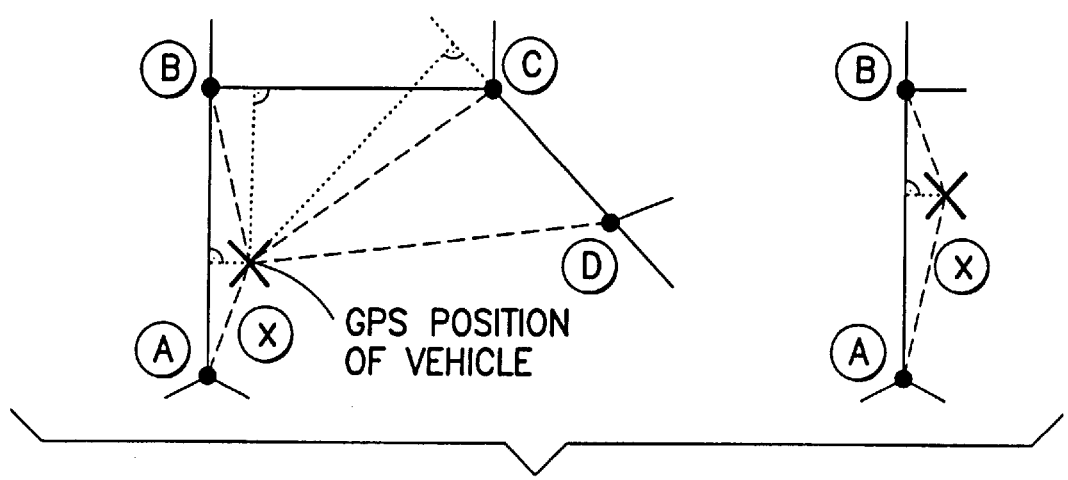
FIG. 16 shows the process of determining the starting position and starting direction.

In order to determine on which street the vehicle is located, firstly all the streets located in the vicinity are searched through and it is checked whether the vehicle could be located on these streets. For this purpose, the length of the street and the distances between the end points of the street and the current GPS position are calculated. If just one calculated element is longer than the length of the street, the vehicle could not be located on this street. In FIG. 16, for example the distance $\overline{AB}$ is greater than the distance components between the vehicle and the end points of the street, that is to say, $\overline{Ax}$ and $\overline{Bx}$.

The same applies to the street $\overline{Bc}$. However, the vehicle may not be located on the street $\overline{CD}$ because the element $\overline{Dx}$ will be the longest side of the triangle $\overline{CDx}$.

In order to determine the most probable location on the map, the orthogonal distance from the possible streets is measured. The street with the shortest distance, in the example this is street $\overline{AB}$, is registered as the position on the map.

Figure 17B:
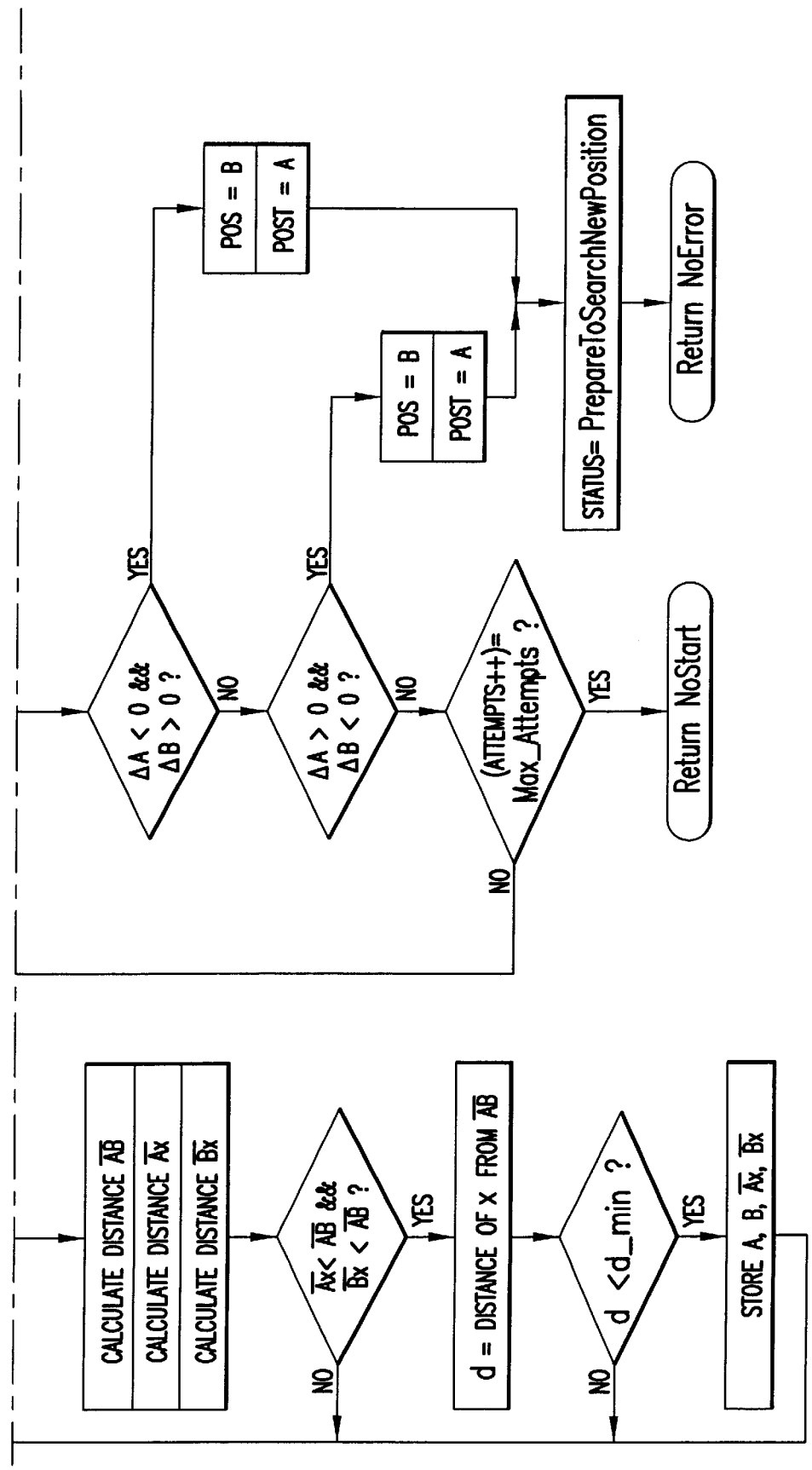
FIG. 17 shows a program flowchart for the process of determining the starting position.

Subsequently, the direction of the vehicle must be determined. To do this, it is necessary to wait for a change in position. After the vehicle has travelled a defined distance, the distance from the two end points is measured again—as can also be seen in FIG. 16. If the vehicle is located on the expected street, and if said street runs virtually linearly between the two end points, the vehicle must be approaching one of the end points (B) and moving further away from the second end point (A). The differences between the distances from the two end points of the supposed street must therefore differ in terms of their sign before and after the movement. In this way, it is possible to determine the point towards which the vehicle is moving and the point which was the last to be passed. FIG. 17 illustrates the program flowchart for the determination of the starting position.

Figure 18:
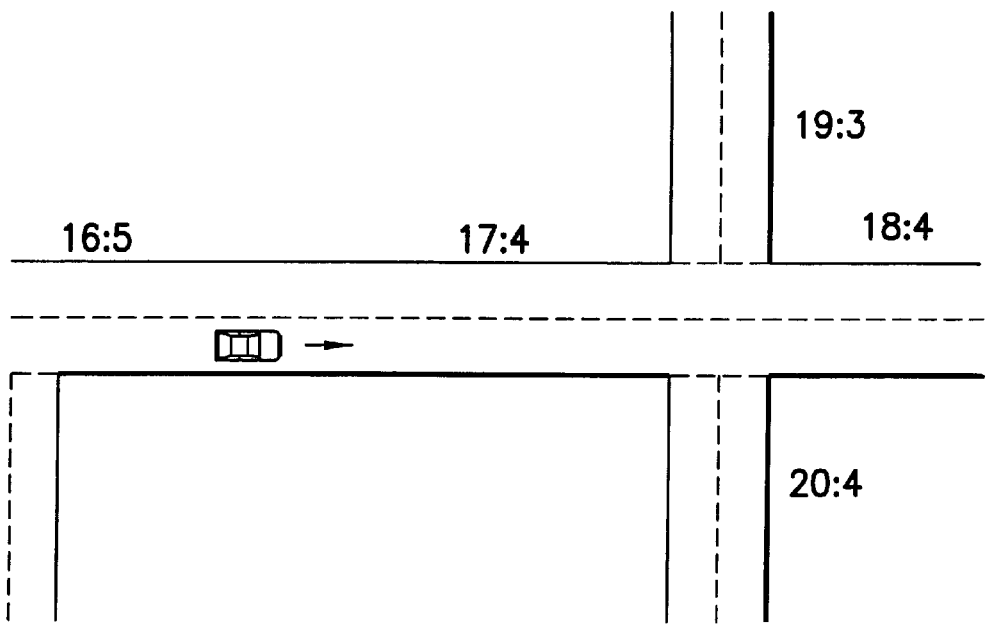
FIG. 18 shows the journey to an expected point.

If the status in which the vehicle drives up to an intersection is attained, the point which is to be made for is in the variable post. In FIG. 18, this is the point 17. Firstly, the last point (16) which has been passed is saved in the variable pre. Then, the direction which is the next to be travelled in at the next intersection is determined. This direction information is stored in the variable dir. In FIG. 18, the variable dir is thus given the value LEFT. Because this determination of the direction for the relevant position can take place once, but the following status is run through more often, this is assigned to the status PrepareToSearchNewPosition.

The status SearchNewPosition which then follows is run through until the vehicle has arrived at the intersection or at another point on the map which is located at the intersection.

Figure 19:
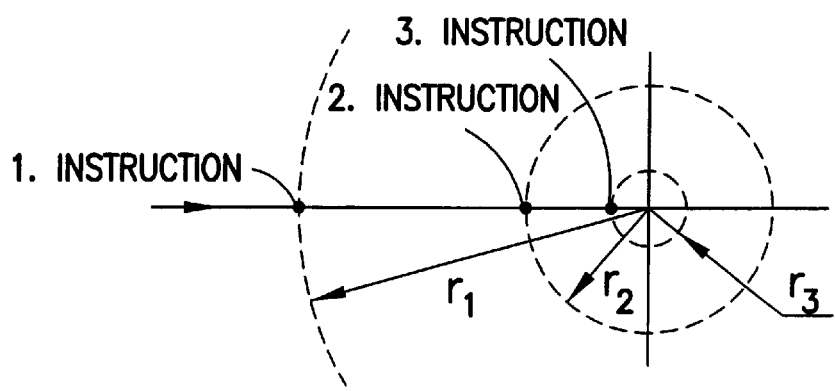
FIG. 19 shows the distances of the instruction.

In the meantime, instructions to the driver for three different distances $d_i$ will indicate the direction to be travelled in. For this purpose, the distance $d(x)$ from the point which is to be driven to is measured with each measured GPS position x, and compared with three predefined radii which should correspond to the distances of the instructions. The first instruction is given, for example, if the distance $d(x)$ is smaller than a corresponding radius $r_1$, and the first instruction has not yet been given. If the distance $d(x)$ were greater than the radius $r_1$, the system would wait until the vehicle enters the radius. FIG. 19 shows the radii and the instructions associated with them.

The first instruction is intended to provide the driver with the possibility of preparing himself at an adequate distance, i.e. getting into the correct lane for example. This instruction is given when the vehicle enters the radius $r_1$ around the coordinates of the expected point. The second instruction is given at a short distance $d_2$ before the action which is to be taken.

The distances are dimensioned for town traffic and the associated low speed. Because, for example, in the case of motorways the instruction has to be given earlier, a distance $s_v$ is added to the radii $r_1$ and $r_2$, which is dependent on the speed $\lambda$ of the vehicle. In order to obtain $s_v$, the square of the speed (in km/h) is divided by the factor 8. The divisor 8 has proven favourable during test runs. Using said factor, the first instruction will be given at a distance of approximately $d_1=1.5$ km at, for example, a speed of 100 km/h. The dependence of the radius on the speed of the vehicle is represented in Equation 5.

$$d_i = \begin{cases} r_i : d(x) \le r_i \\ r_i + s_v : d(x) > r_i \end{cases} \text{ with } s_v = v^2/8 \quad (5)$$

The third and last instruction relating to the next point is given as soon as the intersection has been detected, and, in contrast to the first two instructions, it reproduces in voice form only the direction which is to be travelled in.

If the measured position coordinates are located within the circle with the radius $r_3$ around the point which is being searched for, this point is detected as the location. In contrast to the two other radii, this radius is not dependent on the speed.

If the vehicle has arrived at the expected intersection, the current location of the vehicle, which is stored as the point in pos, corresponds to the expected point post. The next point which is to be driven to can then be registered in post, and the third instruction can be entered. In order to determine the actual direction which is being travelled in at the intersection, the system changes into the status FindDrivenDirection. This status will be described later.

In addition, it is necessary to check whether the destination and/or the street name entered at the start of the navigation has been reached. In this case, the respective instruction relating to whether the destination has been reached is output, and the system changes into the status ReachedDestination which indicates this.

Figure 20B:
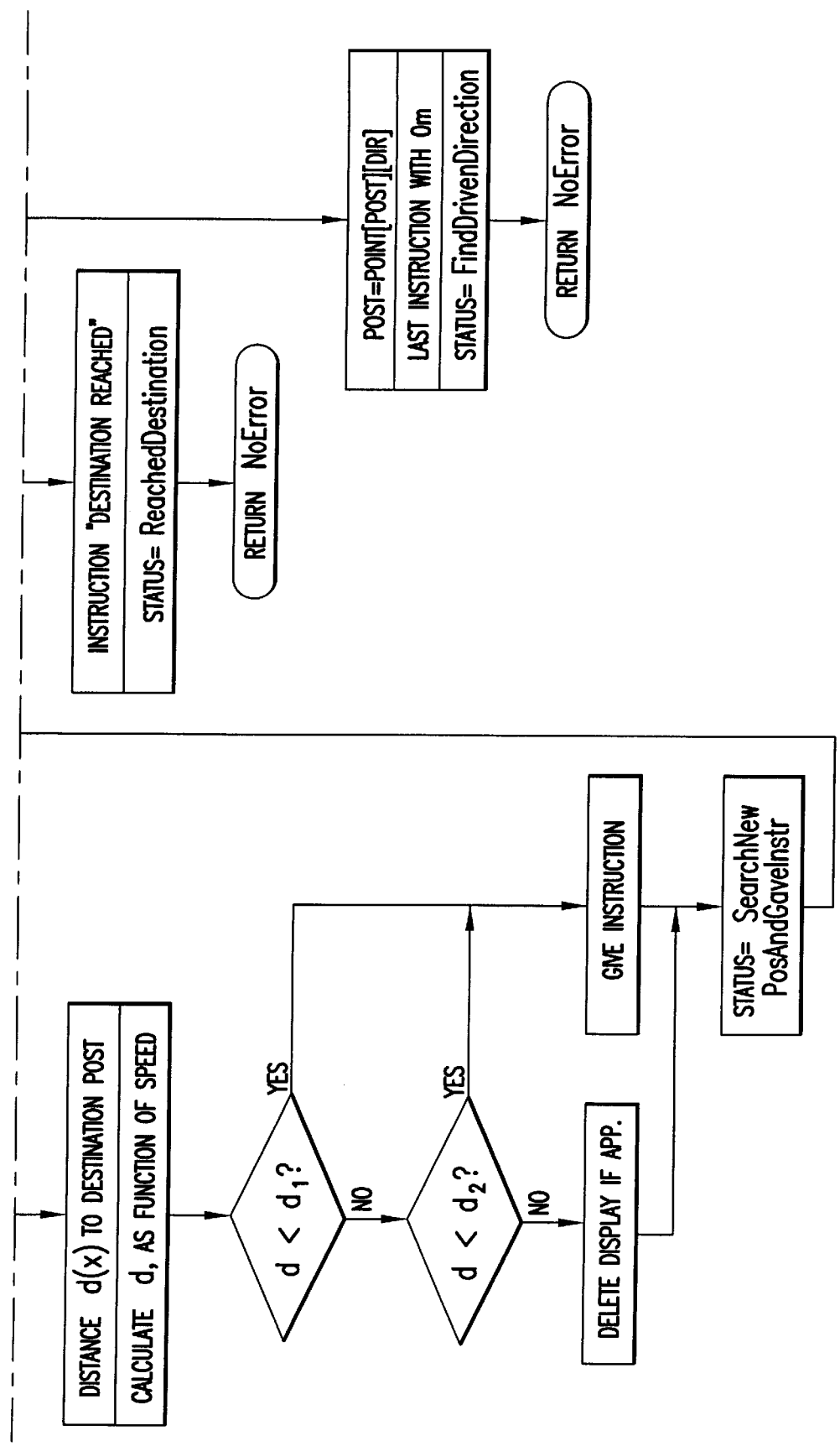
FIG. 20 shows the journey to the expected point.

FIG. 20 shows the program flowchart of the approach to the expected point.

The direction driven is determined using the orientation of the movement of the vehicle with respect to the North Pole, calculated using the GPS receiver. This orientation is stored when the previously described radius $r_3$ about the intersection is entered.

Figure 21:
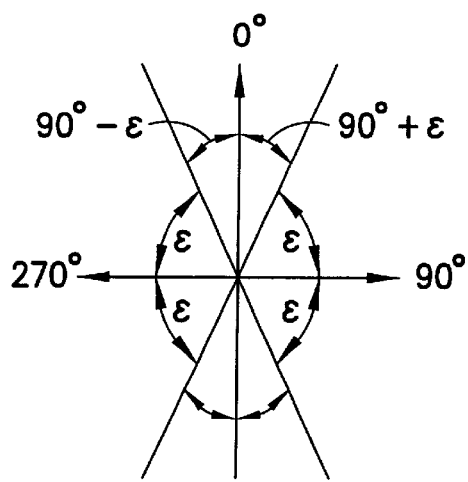
FIG. 21 shows an example of the process of detecting a direction of travel.

The "route" program then waits until the vehicle leaves this circle with the radius $r_3$ again. The orientation is determined again and subtracted from the previous one. If the result is negative, 360° is added. This difference permits, as is shown by FIG. 21, the direction of travel to be assessed. If the difference fluctuates by 90°, it can be assumed that the vehicle has turned off to the right. The differential angle is permitted with a tolerance of $\pm\epsilon$. For detection of the left-hand direction, the difference must therefore lie between 270° $\pm\epsilon$.

Figure 22:
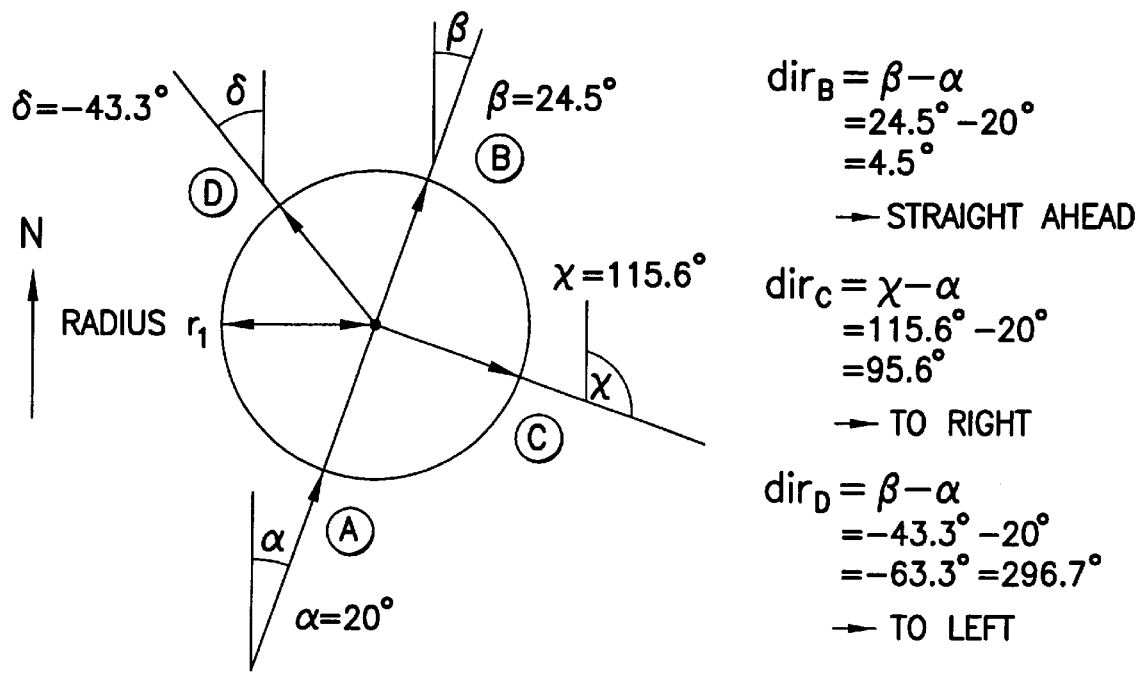
FIG. 22 shows a further example of the process of detecting a direction of travel.

If the vehicle is travelling straight ahead, the angle changes only slightly. For this reason, the tolerance limit here need not be as large as in the case of turning off from a road. Travelling straight ahead is detected with a tolerance limit of $\pm(90°-\epsilon)$ and turning around at 180 with $\pm(90-\epsilon)$ FIG. 22 shows an intersection which is intended to clarify, by way of an example, how the direction is determined.

However, the direction of travel cannot be determined on a motorway using the above-described method. Firstly, the relevant point of the exit is registered at or before the slowing-down lane, and secondly it is frequently not possible to determine a change in angle at a motorway exit because the exit runs parallel to the motorway. For this reason, in the case of a motorway, the direction of travel is made equivalent to the determined direction, and it is thus assumed that the driver has followed the instruction. The direction of travel is checked when the next point is found.

Figure 23B:
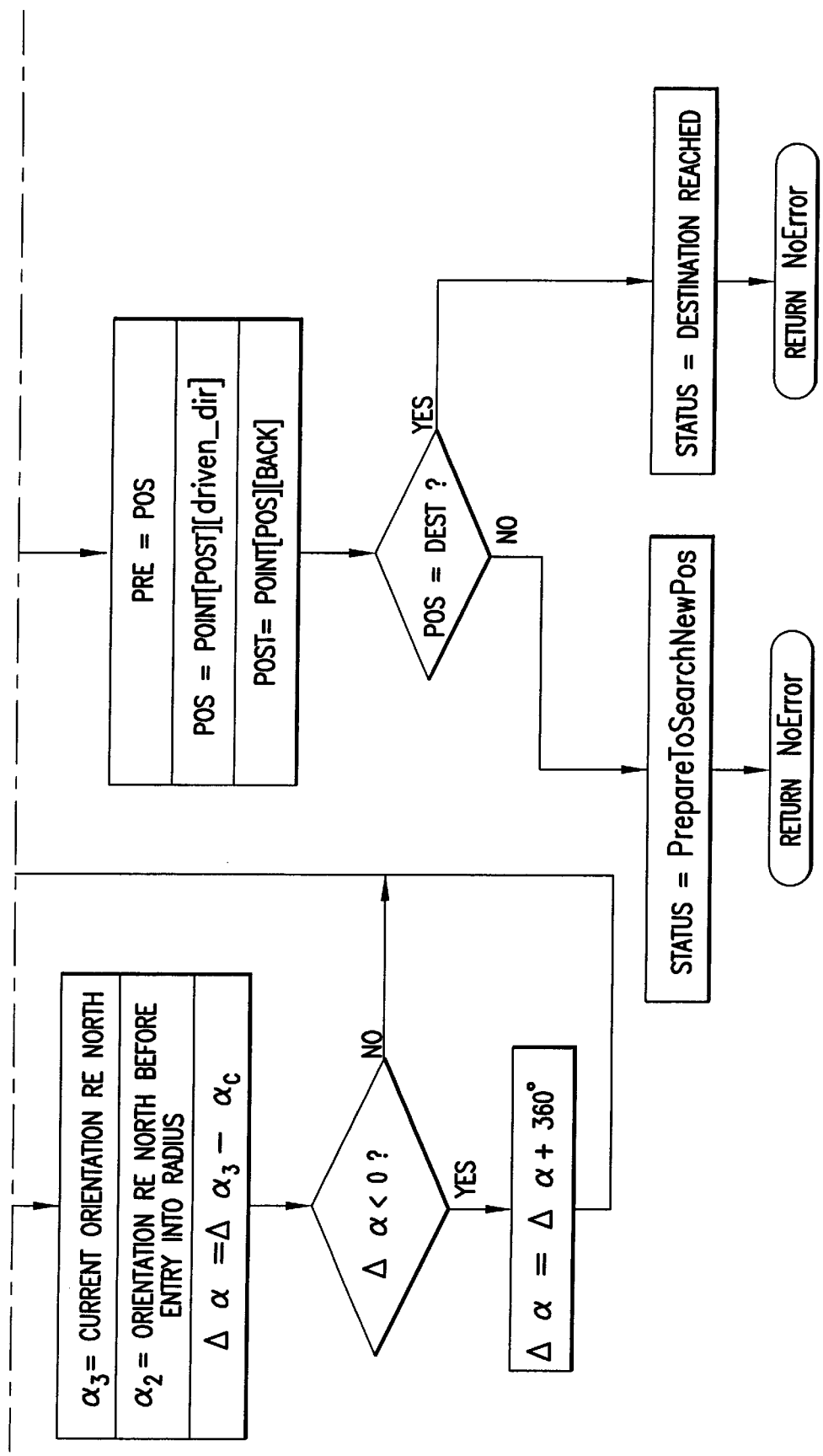
FIG. 23 shows a program flowchart of the process of detecting the direction of travel.

After turning off from the road, it is necessary to test— which is comparable with approaching the expected point— whether the destination has been reached. If this is not the case, the next point which is to be driven to, which is located "at the rear" of the actual point, can be stored in post. The system is then changed back to the status PrepareToSearchNewPosition. The detection of direction is illustrated schematically in FIG. 23.

This change between the approaching of the desired point and the determination of the current direction continues until the destination is reached. The instruction with the information that the destination has been reached is then output, and the program can be terminated.

The possible errors and their consequences will be discussed in the following section.

Figure 24A:
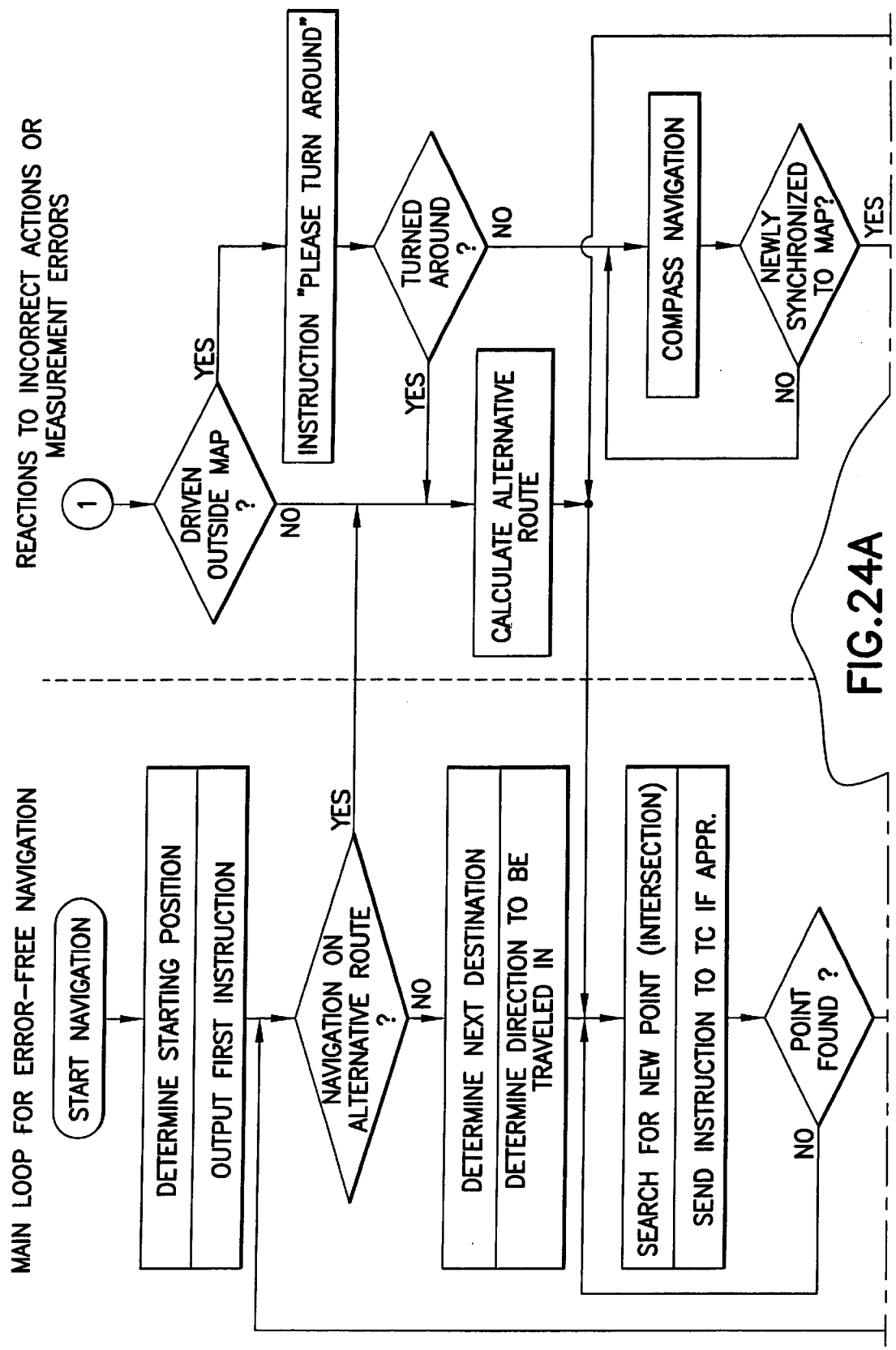
FIG. 24 shows a program flowchart for navigation with possible errors.

Basically there are two errors which can occur during a navigation process. In FIG. 24, these are added to the program flow chart for error-free navigation from FIG. 14.

An error comprises turning off a road incorrectly at a junction or intersection. This is determined with the direction detection process (numeral 1). If the error is detected, it must firstly be tested whether the vehicle has left the area of the digital map transmitted from the server, i.e. whether the driver has driven beyond the boundary of the map. If this is not the case, a new route, which leads the driver, "as well as possible" to the existing route or to the destination, can be calculated. The calculation of this alternative route will be described below.

In addition, it may be the case that the point which has been found does not correspond to the expected destination or the intersection. This error situation is detected at numeral 2 in the program flow chart. It may have various causes:

The direction detection was incorrect, and an adjacent point of the last intersection passed was therefore found.

A point of the last intersection passed is found because the vehicle has turned.

Points which bear a relationship to the current position are found. This can have various causes: firstly, measuring errors may have occurred, secondly the vehicle may be located in the vicinity of the points which are found, but not have any direct connection to them. This often occurs when travelling on motorways because the points of the roads which cross over may be located very close to the motorway. In addition, it is possible for the vehicle to be actually located on the position determined on the map. This can be due to missing position information as a result of defective GPS position data or an imprecise map or the fact that a street which does not exist on the map has been travelled along in the meantime.

The reaction to the possible errors will now be presented.

Figure 25:
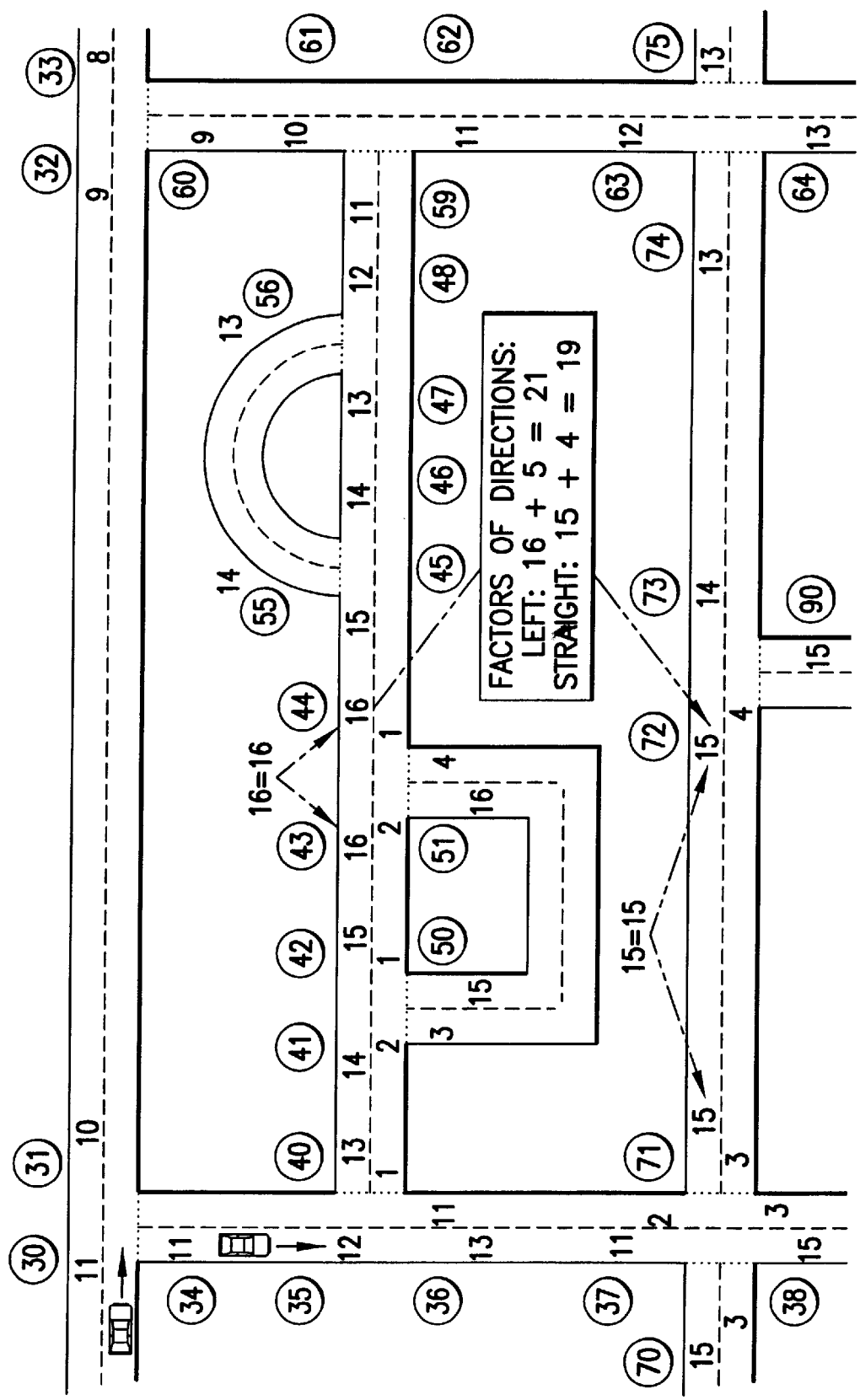
FIG. 25 shows the principle of calculating an alternative route.

If the vehicle has departed from the calculated "optimum" route, it can no longer be guided by means of the routing points calculated by the server. For this reason, an attempt is made, by way of the same principle which was previously applied in the calculation of the route, to find a way back to the calculated route. However, the requirements for the calculation are reversed: the destination–the optimum route–is not known as a point. For this reason, the origin of the wave of the Lee. algorithm cannot be the destination. A wave–in the example the points 36 and 40–is started, as shown in FIG. 25 from the intersection which is the next reached, from each point branching off from said intersection. This is continued until the wave meets routing values which are no longer rising. In this way, it is possible to guide the vehicle to the destination again. In the example, for the wave at point 40 with the fifth routing value, the original routing value is identical to the corresponding value of the fourth increment. For this reason, an error-free navigation can take place again starting from here.

The calculated value of this wave is added with the routing value which is found. The result serves as a criterion for this direction.

After a result has been found in all the directions in which it is possible to travel, the direction with the smallest distance from the destination is stored in the variable dir. In this case dir=STRAIGHT is set.

Then, as in the case of incorrect navigation, the system waits until the intersection is reached and the driver has turned off the road.

Even if the driver has kept to the instruction of the program this time, it is now necessary to calculate an alternative route again because the routing values of the server are still without validity. For this reason, during the initial calculation of an alternative route, the variable drive_alternative are set to TRUE in order to start a calculation again from the main loop of the error-free driving. In the program, this variable is placed in the structure pos, and comprises pos>drive_alternative.

If the vehicle makes a correct turn at an intersection, in accordance also with the routing values supplied by the server, the program detects that error-free navigation is possible again.

During the calculation it is possible that no direction leads to the destination, or that the detour is too long. In order to prohibit long detours with the instruction "please turn round", a value has been introduced which stops the emitted wave of directions when a threshold value is exceeded. This value can be set individually.

Figure 26B:
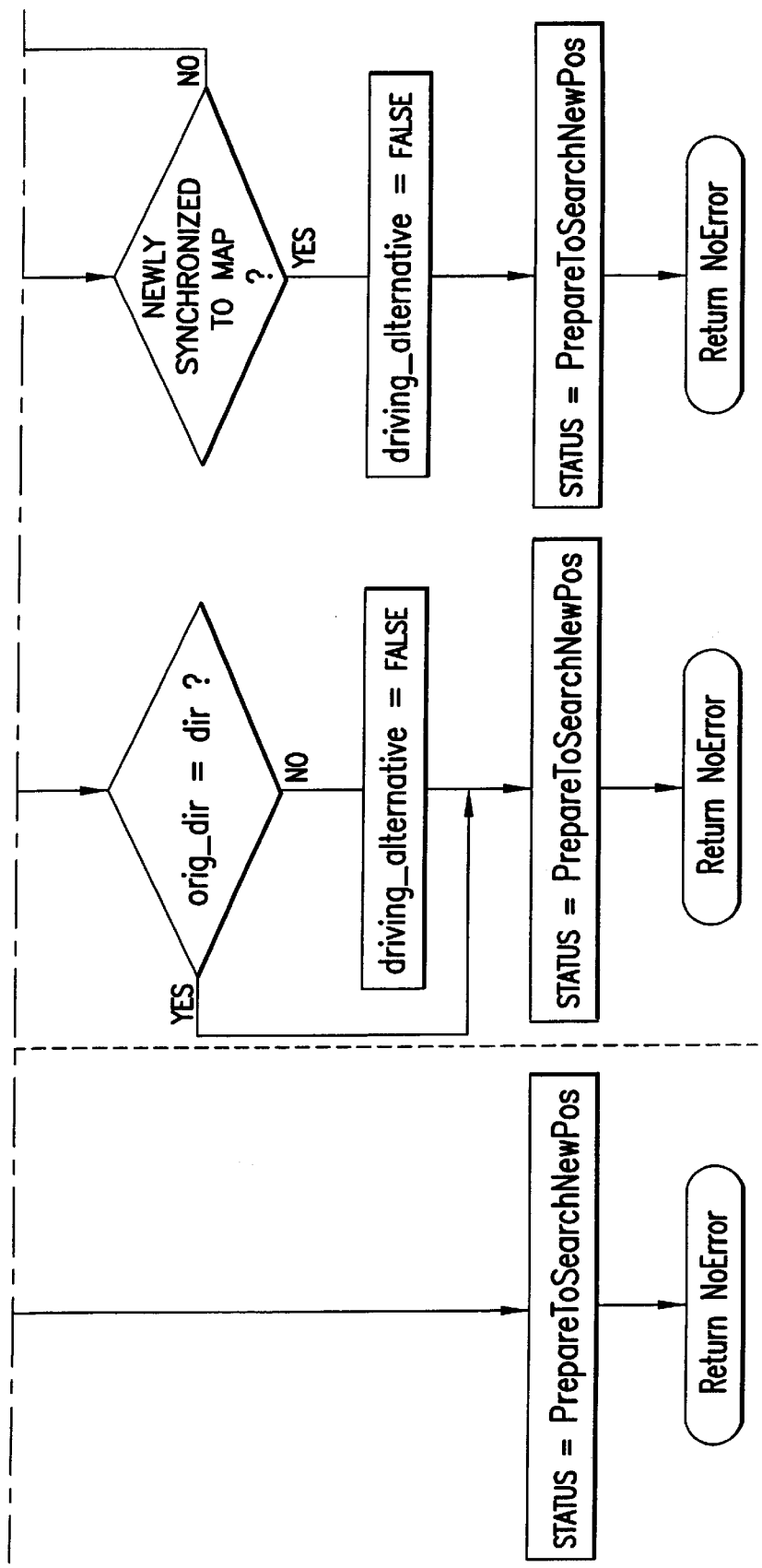
FIG. 26 shows a program flowchart for the reaction to incorrect turning-off from a road.
Figures 27, 27A:
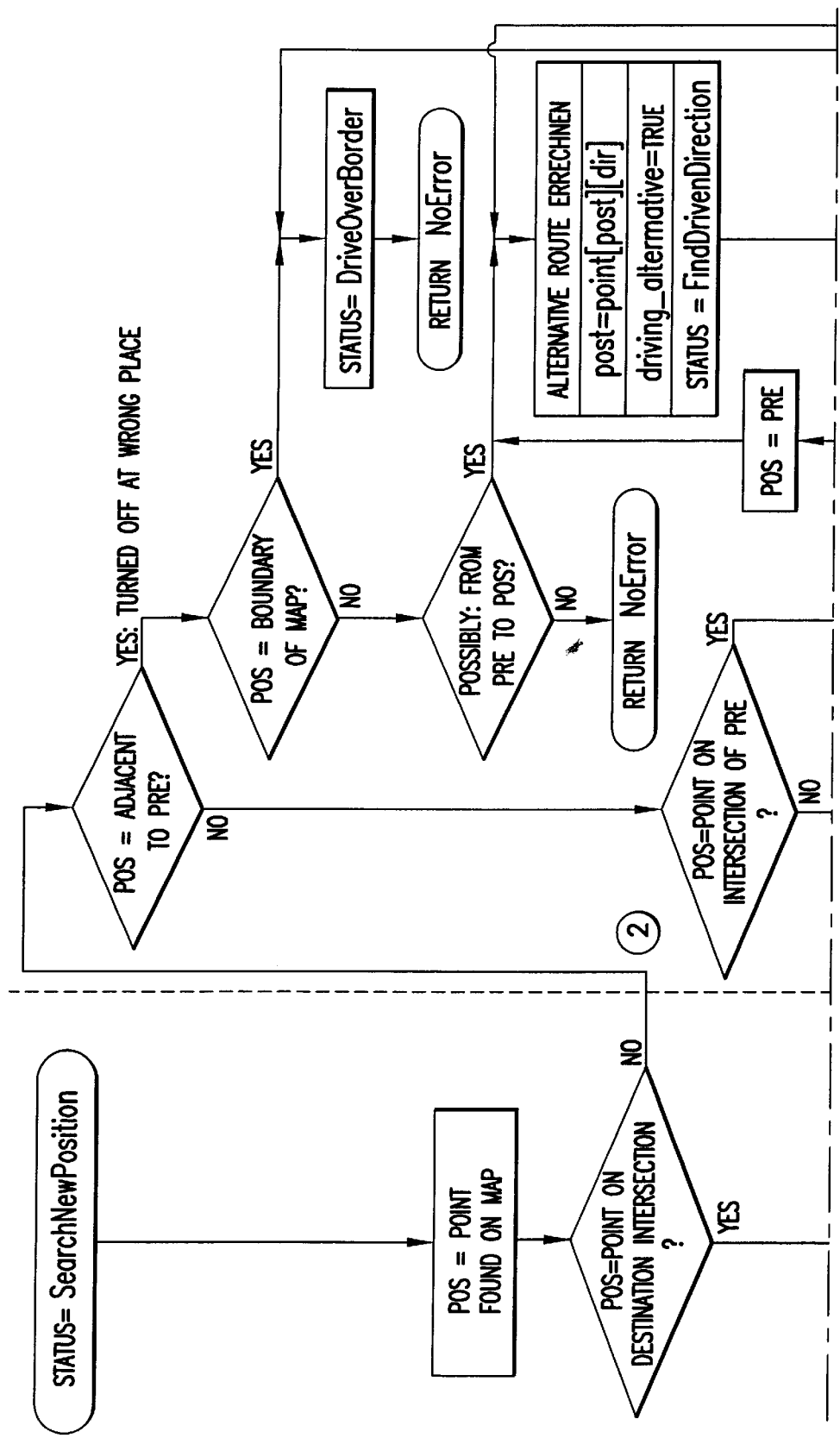
FIG. 27 shows a program flowchart for the reaction to when an incorrect point is found.
Figure 27B:
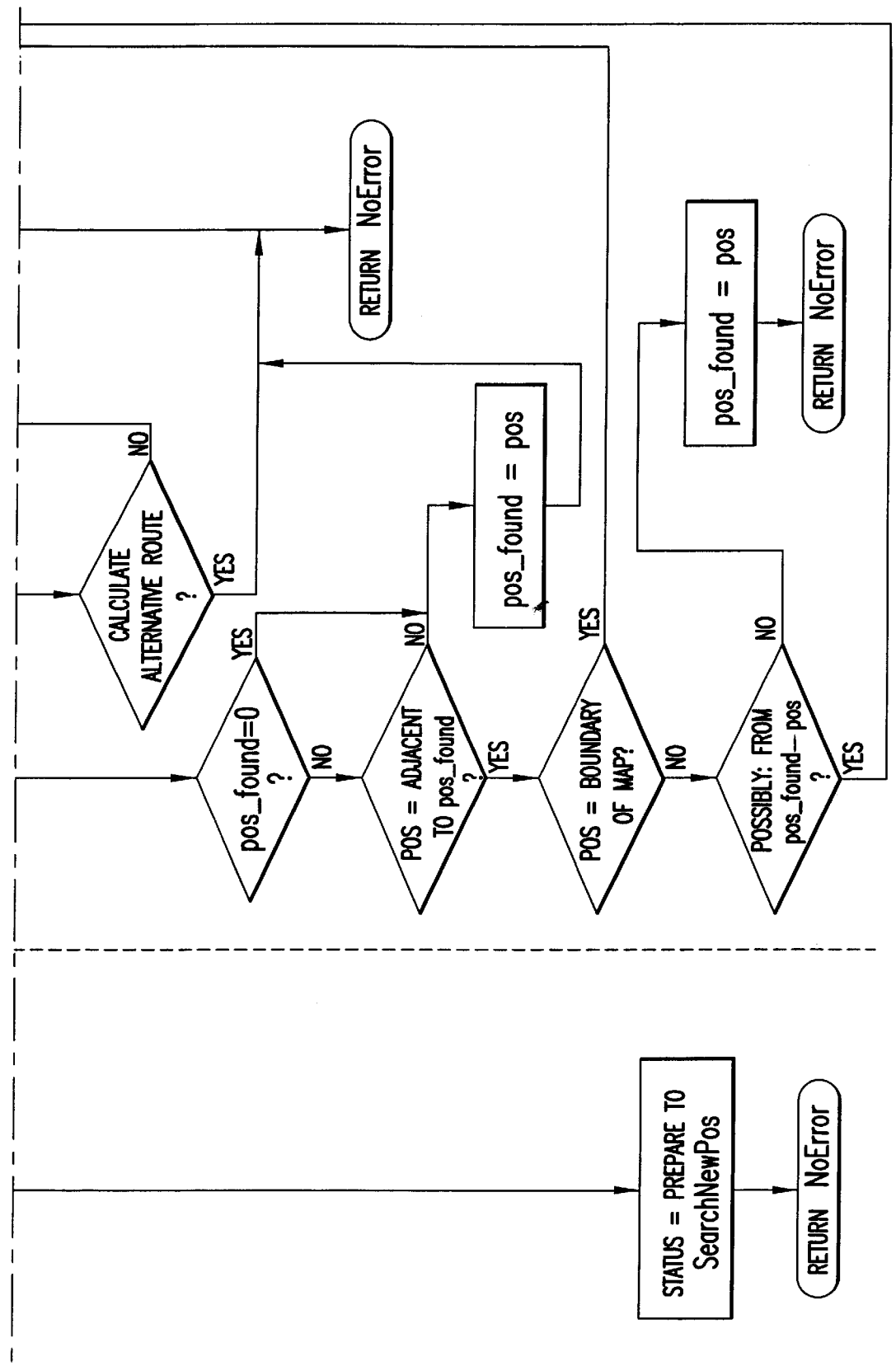

With regard to the reaction to possible errors, the case of incorrect turning off from a road will be considered. After drive_alternative is set to TRUE, and the status of the navigation has changed to DrivingAlternative, it is necessary to check whether the vehicle is located outside the map. If the vehicle has driven beyond the boundary of the map, the system changes to the compass navigation described earlier. FIG. 26 clarifies this using a program flow chart.

If the vehicle is located within the map, an alternative route can be calculated. The direction to be travelled in is located in the variable dir, and the point to be driven to is given in post. The direction which ought to be travelled in according to the routing values of the server, is now determined. If the driver has in fact turned off the road at an incorrect place, this would be BACK. However, if an alternative route has already been calculated frequently, the alternative direction and the optimum direction may be the same. Thus, error-free navigation would be possible again because the alternative route corresponds to that calculated by the server. The variable drive_alternative is then reset to FALSE, and it is possible to wait until the vehicle reaches the point to be driven to post.

If the second possible error occurs, that is to say an unknown point on the map is found, it is initially tested whether the point which is found is an adjacent point of the previous one, i.e. whether the direction which was determined at the last intersection was incorrect. If this is the case, a new direction can be assumed. It is then necessary to check whether the vehicle has left the map. In this case, the system changes again to the status DriveOverBoundary. This can be found again in FIG. 276 in the program flow chart.

It is then necessary to check whether it is possible for the driver to have driven in the supposed direction. In the case of motorways, it is, for example not possible for an incorrect direction of travel to have been taken. If the direction of travel is valid, the alternative route can be calculated and the direction of travel determined in the main loop.

If it was not possible to classify the point which was found as an adjacent point of the previous one, the possibility of turning is examined. If the vehicle has turned, the point which is found is on the same intersection as the last one to have been passed. Then, it is not possible to assume that the vehicle has turned on a motorway. If this can be ruled out, an alternative route is calculated.

If the point which is found can still not be classified, it is initially stored in pos_found, so that, in the case of a measuring error, the system is not synchronized immediately to a new position on the map. At the start of the calculation of the alternative route, the variable of the point which was found first is to be initialized with 0.

If a second unknown point is found, it is tested whether its intersection is directly connected to the intersection of the stored point. If this is the case, and if, according to the traffic regulations (plus or minus sign on the map) it is also possible to pass successively through the two points found pos_found (first point found) and pos (last point found), it can be assumed that the vehicle is located at the measured position on the map. The alternative route can then be calculated for this position, and the system can wait for the direction of travel in the main loop.

If it was not permitted to travel from pos_found to pos—for example in the case of one-way streets—the last point found is buffered again.

In addition, it is always necessary to test whether the vehicle has left the map.

If the vehicle has left the map excerpt which is present in the vehicle, there are two possible reactions: a new map corresponding to the area is requested or the vehicle is guided back into the known area using compass navigation. The method of operation of compass navigation is explained below.

Figures 28, 28A:
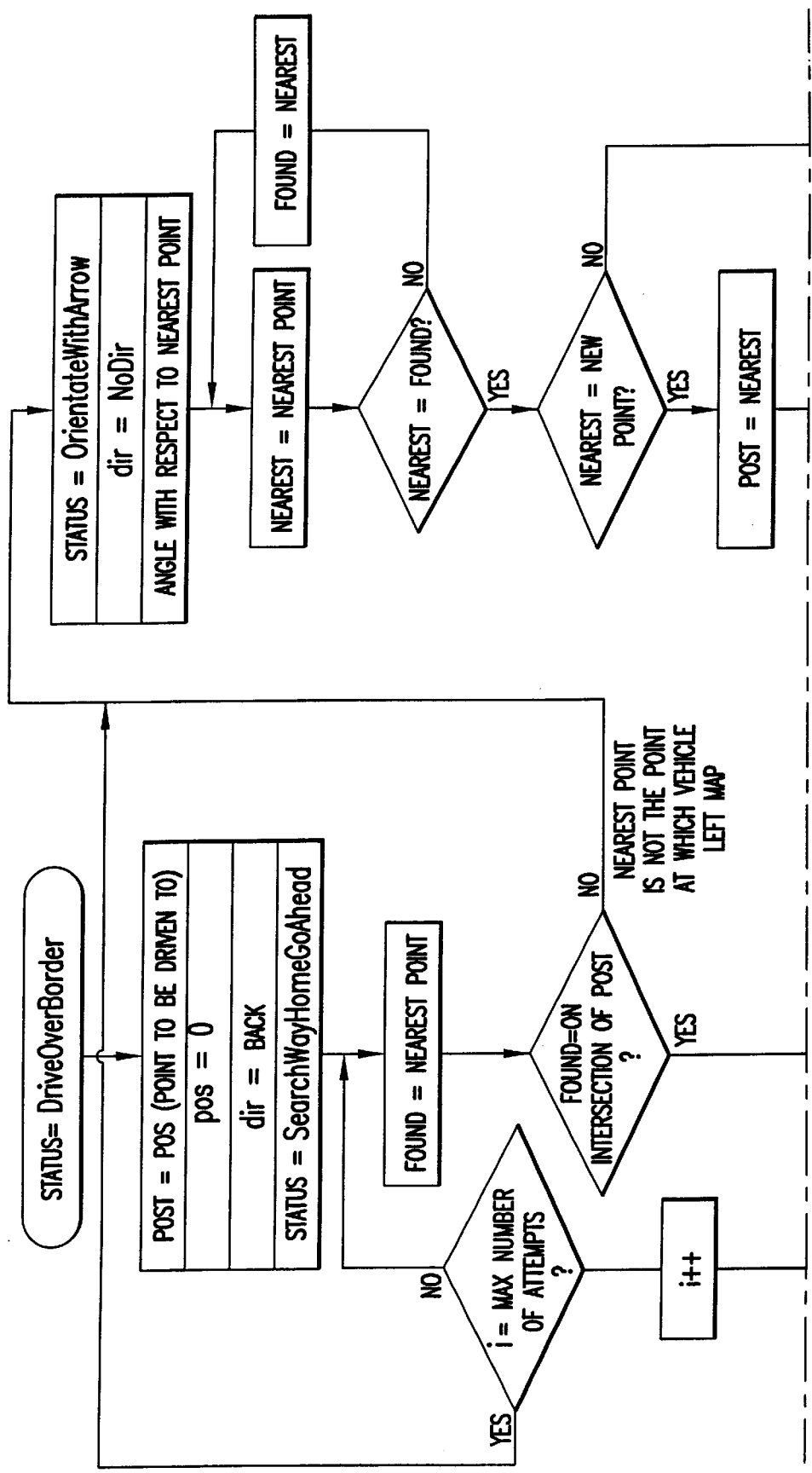
FIG. 28 shows a program flowchart for compass navigation.

Because compass navigation should be avoided as long as possible, when the driver leaves the area he is initially requested to turn back. The point to be driven to post is equivalent to the last point passed pos, as is shown in the program flow chart of the entire compass navigation process in FIG. 28. This last point passed becomes 0. The direction to be travelled in dir is BACK.

The program then changes into the status SearchWayHomeCoAbroad. Here, it is monitored whether the driver actually turns back. This is carried out according to the same principle as the finding of the direction of travel during error-free navigation. In contrast to the determination of the direction of travel, here it is monitored continuously whether the vehicle turns backs. The number of attempts is also counted, and when a maximum number of attempts has been determined the system is changed over to compass navigation.

During the monitoring to determine whether the vehicle turns back, the point on the map, which lies nearest to the direct distance, is searched for. For this purpose, the distance from all the points located on the map is measured. If the exit point on the map is not the closest point, the closer point is made for using the compass.

Figure 29:
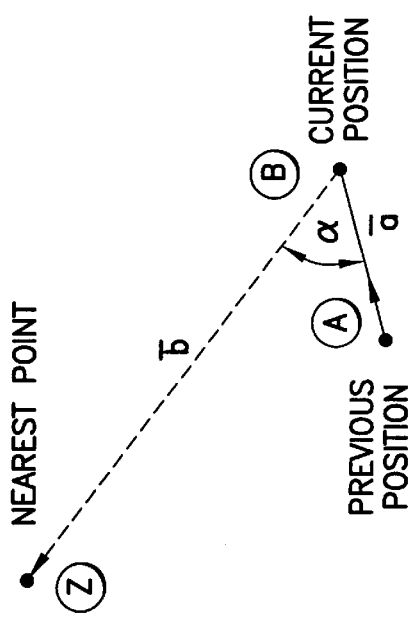
FIG. 29 shows the process of determining an angle for the compass representation.

If the program changes to compass navigation, the point which is to be made for is stored in post. In order to give a direction pointer for this point, the angle between this distance vector $\vec{b} = \vec{BZ}$ and the driving direction of the vehicle $\vec{a} = \vec{AB}$ is searched for—as is shown in FIG. 29.

Because the actual location B occurs in both vectors, its degree of longitude is selected as a reference point. As a result, the Cartesian coordinates which are shown in equation 6 are obtained for the points A, B and Z.

$$\vec{A} = \begin{pmatrix} R\cos(\varphi_A)\cos(\lambda_A - \lambda_B) \\ R\cos(\varphi_A)\sin(\lambda_A - \lambda_B) \\ R\sin(\varphi_A) \end{pmatrix} \quad (6)$$

$$\vec{B} = \begin{pmatrix} R\cos(\varphi_B) \\ 0 \\ R\sin(\varphi_B) \end{pmatrix}$$

$$\vec{Z} = \begin{pmatrix} R\cos(\varphi_Z)\cos(\lambda_Z - \lambda_B) \\ R\cos(\varphi_Z)\sin(\lambda_Z - \lambda_B) \\ R\sin(\varphi_Z) \end{pmatrix} \text{ with degree of latitude } \varphi \text{ degree of longitude } \lambda$$

The angle $\alpha$ is calculated using the scalar product of the two difference vectors $\vec{a} = \vec{B} - \vec{A}$ and $\vec{b} = \vec{Z} - \vec{B}$, which is shown in equation 7:

$$\cos(\alpha) = \frac{a_x b_x + a_y b_y + a_x b_x}{\sqrt{a_x^2 + a_y^2 + a_z^2}\sqrt{b_x^2 + b_y^2 + b_z^2}} \quad (7)$$

Figure 30:
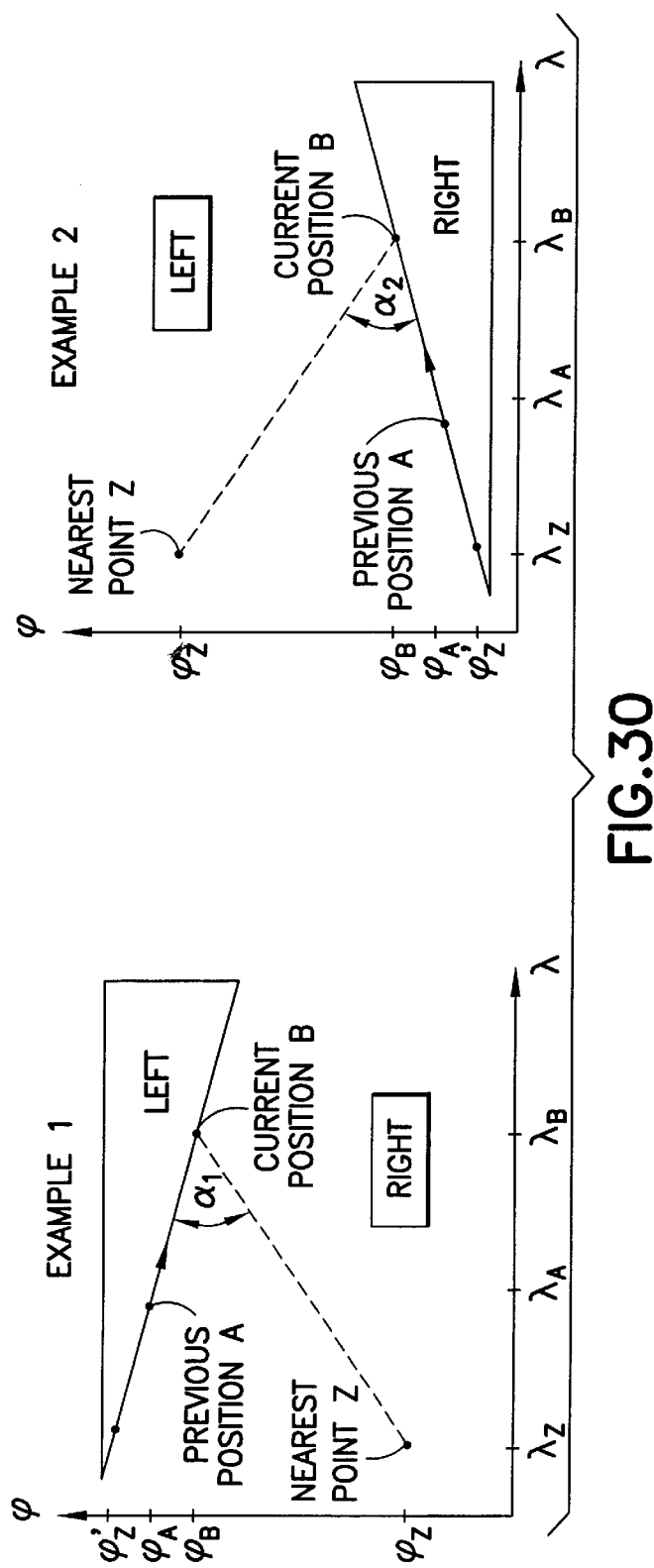
FIG. 30 is a diagram showing the ambiguity of the calculated angle for the compass.

Because the arccos (x) supplies an angle between 0 and 180°, the result is not definite. As is shown in FIG. 30, at a given angle the program cannot decide whether the vehicle should be steered in the right-hand direction or in the left-hand direction.

For this reason, it is determined whether the point to be driven to is to the right or left of the movement vector of the vehicle. For this purpose, the degrees of latitude and longitude of the earth are assumed to be linearly dependent in the relevant area, and the linear equation $\phi = m*\lambda + b$ is applied. This is possible because two points of the straight lines are known. By determining m and b, the linear equation 8 is obtained:

$$\varphi = f(\lambda) = \underbrace{\frac{\varphi_A - \varphi_B}{\lambda_A - \lambda_B}}_{m} * \lambda + \underbrace{\varphi_B - \frac{\varphi_A - \varphi_B}{\lambda_A - \lambda_B}}_{b} = \frac{\varphi_A - \varphi_B}{\lambda_A - \lambda_B} * (\lambda - \lambda_B) + \varphi_B \quad (8)$$

By inserting $\lambda_z$ into the linear equation, $\phi'z$ is obtained. It is then possible to check whether $\phi z$ is greater than or less than $\phi'z$. If the direction of travel is then taken into account, it is possible to say whether $\phi_z$ is to the left or right of the direction of travel.

This is determined by means of the degrees of longitude $\lambda_A$ and $\lambda_B$. If $\lambda_B > \lambda_A$ and $f(\lambda_z) > \phi_z$, the point is, as shown by Example 1 in FIG. 30, to the right of the vehicle. The angle can then be accepted without change.

If, as in Example 2, $\lambda_B > \lambda_A$ and $f(\lambda_z) < \phi_z$, the point is to the left of the vehicle. The angle must then become negative, or, in order to retain a positive sign, it is possible for $\alpha \leftarrow 360° - \alpha$ to be performed.

If $\lambda_B < \lambda_A$, the vehicle therefore drives in the other direction with respect to the degrees of longitude. For this reason, under the condition $f(\lambda_z) > \phi_z$, the point will be to the left of the vehicle.

The simulation of the navigation will demonstrate the method of operation of the "route" program or the communication between it and the TC, even without the data of a GPS receiver. As a result, the instructions are not assigned directly to the environment, but it is possible to perform stationary demonstrations for a relatively large number of observers.

In order to carry out this simulation, a simulation file must be created. To do this, the data of the GPS receiver are written to a file using the "infile" program. Then, while the "route" program is operating, the input from the serial interface can be diverted to this file.

The operation of the simulation is set in the configuration file. Here, the filename must also be given with the directory and the clock rate at which the data are to be input from the simulation file.

Within the scope of the invention, a navigation system has been presented which is based exclusively on the position-finding with GPS and which does not require any further mechanisms. The navigation system can thus be installed quickly. The system can be utilized without difficulty for some vehicles by simply retrofitting.

A further advantage is also that the navigation can be carried out in an excerpt of a map with the smallest possible expenditure in terms of data. This is achieved with selective allocation of points for the respective ends of a street located on the map. The map matrix which is created can be expanded as desired and excerpts for the areas travelled through can easily be created. As a result of the low level of expenditure in terms of data, which is achieved by virtue of the allocation of points and the use of the map excerpts, it is possible to transmit the map excerpt to the vehicle by wire-free means. The data can thus be exchanged between a server and the navigation program.

The calculation of the "best possible" route from the map material is therefore based on the generation of routing values to the destination, which values permit a vehicle to be guided from any position on the map. They give a good compromise between the length of the route and the duration of the time of travel because, for example in the case of motorways on which is it possible to travel more quickly, fewer routing values are needed. In the case of supposedly relatively short routes through a town, a large number of branching-off streets can be expected, and does thus under certain circumstances not have the advantage over a motorway.

This calculation of a route can be exported to a provider of mobile services in order, firstly, to minimize the hardware requirements in the vehicle, and, secondly, to enable current traffic information and forecasts to be included in the calculation. In addition, roads may simply be closed or it may become more difficult to drive through them when the respective routing values increase in the case of traffic jams, roadworks, etc. Sections of road or even entire roads can be detected as a coherent unit in this respect.

However, the fact that there is only one map excerpt in order to minimize the data may have, under certain circumstances, disruptive effects for the user. If the vehicle has travelled beyond the boundary of the map, it is no longer possible to navigate. If a new map is requested for navigation, this costs the driver of the vehicle time and money. The compass navigation which is used does indeed constitute a compromise, but it is not convenient for the user because the arrow only serves as an orientation aid and cannot issue instructions to the driver.

However, directly connecting a navigation system to a mobile-radio service provider facilitates further development and implementation of related applications such as emergency call services and breakdown services, anti-theft systems, "floating car data" concepts, remote diagnostics and maintenance or information services unrelated to transport and traffic. If the data which are to be transmitted are compressed further, or even other transmission systems which are equipped with a higher transmission rate are used, it is possible to transmit a larger map excerpt. Said larger map excerpt can permit the driver to take incorrect actions repeatedly.

What is claimed is:

1. Method for navigating an object starting from a starting point to a destination along traffic routes which are contained in an electronically stored traffic route map, and which traffic routes are provided with routing points, comprising steps of:

assigning routing values to the routing points, which routing values, starting from the destination, are calculated in the manner of a propagating wave across the traffic routes, either only increase or only decrease as the distance from the destination in any traffic route grows larger; and navigating the object using the routing values which only decrease or only increase irrespective of the traffic route being followed.

2. Method according to claim 1, wherein the routing points are permanently assigned to the traffic routes.

3. Method according to claim 1, wherein the routing points are positioned in the vicinity of points where traffic routes intersect.

4. Method according to claim 1, wherein the routing points are positioned in the vicinity of bends in the traffic routes.

5. Method according to claim 1, wherein a plurality of routing points which are located one behind the other are positioned distributed along relatively long junction-free sections of traffic routes as compared to the other sections of the traffic routes having closely located junctions.

6. Method according to claim 1, wherein the routing values are assigned to the routing points on the basis of route elements.

7. Method according to claim 1, wherein the routing values are assigned to the routing points taking into account the type of traffic route in the vicinity of the respective routing point.

8. Method according to claim 1, wherein the type of traffic route in the vicinity of a routing point is determined by a multidimensional vector.

9. Method according to claim 1, wherein the traffic route map is stored in the object, and the routing values are assigned to the routing points at the object within a map excerpt of said stored traffic route map.

10. Method according to claim 1, wherein the traffic route map is stored at a service provider, and the routing values are assigned to the routing points at the service provider within a map excerpt of said stored traffic route map.

11. Method according to claim 10, wherein the map excerpt of the traffic route map is supplemented at the service provider and transmitted to the object at the request of the service provider.

12. Method according to claim 9, wherein the size of the map excerpt is determined by the positions of the starting point and destination.

13. Method according to claim 9, wherein, when the object leaves the area covered by the present map excerpt, a new map excerpt is called in which the routing values are assigned to the routing points with respect to the old destination and a new starting point.

14. Method according to claim 9, wherein, when the object leaves the area covered by the present map excerpt, a compass navigation back to the map excerpt takes place.

15. Method according to claim 9, wherein the map excerpt is transmitted via a telephone link.

16. Method according to claim 1, wherein the object is a motor vehicle having means for detecting its actual geographic position.

17. Method according to claim 1, wherein the object comprises a motor vehicle which receives its actual geographic position from a GPS receiver carried along on the motor vehicle.

18. Method according to claim 1, wherein the object is a radio telephone having means for detecting its actual geographic position.

19. Method for navigating an object starting from a starting point to a destination along traffic routes which are contained in an electronically stored traffic route map, and which traffic routes are provided with routing points comprising the steps of:

assigning routing values to the routing points within a map excerpt of said stored traffic route map determined by the positions of the starting point and destination, which routing values, starting from the destination, are calculated in the manner of a propagating wave across the traffic routes, either only increase or only decrease as the distance from the destination in any traffic route grows larger; and navigating the object using the routing values which only decrease or only increase irrespective of the traffic route being followed.

* * * * *